US012116552B2

(12) United States Patent
Bennett et al.

(10) Patent No.: US 12,116,552 B2
(45) Date of Patent: Oct. 15, 2024

(54) LIQUID LAUNDRY COMPOSITION

(71) Applicant: Conopco, Inc., Englewood Cliffs, NJ (US)

(72) Inventors: Julie Bennett, Wirral (GB); Robert John Carswell, Wirral (GB); Holger Michael Türk, Mannheim (DE); Susanne Carina Engert, Bürstadt (DE); Alexander Michael Haydl, Mannheim (DE)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 17/927,654

(22) PCT Filed: May 10, 2021

(86) PCT No.: PCT/EP2021/062327
§ 371 (c)(1),
(2) Date: Nov. 23, 2022

(87) PCT Pub. No.: WO2021/239453
PCT Pub. Date: Dec. 2, 2021

(65) Prior Publication Data
US 2023/0287305 A1 Sep. 14, 2023

(30) Foreign Application Priority Data
May 29, 2020 (EP) .................................... 20177450

(51) Int. Cl.

| | |
|---|---|
| ***C11D 1/00*** | (2006.01) |
| ***B08B 3/04*** | (2006.01) |
| ***C11D 1/12*** | (2006.01) |
| ***C11D 1/22*** | (2006.01) |
| ***C11D 1/29*** | (2006.01) |
| ***C11D 1/72*** | (2006.01) |
| ***C11D 1/722*** | (2006.01) |
| ***C11D 1/88*** | (2006.01) |
| ***C11D 3/00*** | (2006.01) |
| ***C11D 3/26*** | (2006.01) |
| ***C11D 3/37*** | (2006.01) |
| ***C11D 17/04*** | (2006.01) |

(52) U.S. Cl.
CPC .............. *C11D 3/3723* (2013.01); *C11D 1/12* (2013.01); *C11D 1/722* (2013.01); *C11D 3/0036* (2013.01); *C11D 3/3715* (2013.01); *C11D 17/043* (2013.01); *C11D 2111/12* (2024.01)

(58) Field of Classification Search
CPC .... C11D 1/00; C11D 1/22; C11D 1/29; C11D 1/72; C11D 1/88; C11D 3/26; C11D 3/3723; C11D 3/3769; B08B 3/04
See application file for complete search history.

(56) References Cited

U.S. PATENT DOCUMENTS

| | | | |
|---|---|---|---|
| 9,738,754 | B2 | 8/2017 | Ebert et al. |
| 2003/0224964 | A1 | 12/2003 | Gosselink et al. |
| 2008/0172802 | A1 | 7/2008 | Sacrcinelli et al. |
| 2009/0124528 | A1 | 5/2009 | Danziger et al. |
| 2010/0216949 | A1 | 8/2010 | Friedrich et al. |
| 2015/0299620 | A1 | 10/2015 | Jarvis et al. |
| 2017/0369818 | A1 | 12/2017 | Park et al. |
| 2018/0216037 | A1 | 8/2018 | Hamersky et al. |
| 2019/0024026 | A1 | 1/2019 | Delaney et al. |

(Continued)

FOREIGN PATENT DOCUMENTS

| | | |
|---|---|---|
| CN | 1455810 | 11/2003 |
| CN | 102941160 | 2/2013 |

(Continued)

OTHER PUBLICATIONS

Search Report and Written Opinion in EP20177450; dated Nov. 10, 2020.

(Continued)

*Primary Examiner* — Brian P Mruk
(74) *Attorney, Agent, or Firm* — Gerard J. McGowan, Jr.

(57) ABSTRACT

A liquid laundry composition comprising: (i) from 1 to 60 wt % of one or more surfactants selected from non-soap anionic surfactants, nonionic surfactants, and mixtures thereof; and (ii) from 0.05 to 10 wt % of an amphoterically-modified oligopropyleneimine ethoxylate having a following formula (I) wherein E is an ethoxy side chain corresponding to a formula $—(RO)_n—R'$ (I) in which R units are ethylene; n has an average value from 5 to 50, preferably from 10 to 40; R' units are each independently selected from hydrogen and $SO_3—$, wherein at least 30% of R' units, preferably at least 50%, are $SO_3—$; Q units are each independently selected from C1-C4 alkyl, H and a free electron pair, wherein at least 50% of Q units, preferably at least 80% Y, more preferably at least 90% are $C_1$-$C_4$ alkyl; and x ranges from 1 to 3.

(I)

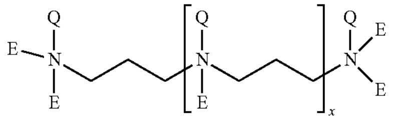

14 Claims, No Drawings

(56) References Cited

U.S. PATENT DOCUMENTS

| | | | |
|---|---|---|---|
| 2019/0169112 A1 | 6/2019 | Eidamshaus et al. | |
| 2023/0220306 A1 | 7/2023 | Tuerk et al. | |

FOREIGN PATENT DOCUMENTS

| | | | | |
|---|---|---|---|---|
| CN | 104968771 | | 10/2015 | |
| CN | 107257846 | | 10/2017 | |
| CN | 107311891 | | 11/2017 | |
| DE | 238043 | | 8/1986 | |
| EP | 0112593 | | 7/1984 | |
| EP | 1198492 | | 10/2003 | |
| EP | 1309546 | | 6/2006 | |
| EP | 1865050 | | 12/2007 | |
| EP | 2662436 | | 11/2013 | |
| EP | 3109306 | * | 12/2016 | ............... C11D 1/94 |
| EP | 2961821 | | 4/2017 | |
| EP | 2961819 | | 8/2017 | |
| EP | 3039109 | | 9/2017 | |
| EP | 3301154 | | 4/2018 | |
| EP | 3039057 | | 10/2018 | |
| EP | 3167034 | | 9/2019 | |
| JP | 08333308 | | 12/1996 | |
| WO | WO9214709 | | 9/1992 | |
| WO | WO9532272 | | 11/1995 | |
| WO | WO0015746 | | 3/2000 | |
| WO | WO0129112 | | 4/2001 | |
| WO | WO03015906 | | 2/2003 | |
| WO | WO2004020563 | | 3/2004 | |
| WO | WO2004024858 | | 3/2004 | |
| WO | WO2005063957 | | 7/2005 | |
| WO | WO2007049250 | | 5/2007 | |
| WO | WO2014131584 | | 9/2014 | |
| WO | WO2014131710 | | 9/2014 | |
| WO | WO2016187085 | | 11/2016 | |
| WO | WO 2016/209784 | * | 12/2016 | ............... C11D 1/94 |
| WO | WO2018046393 | | 3/2018 | |
| WO | WO2020030469 | | 2/2020 | |
| WO | WO 2021/239453 | * | 12/2021 | ............... C11D 3/00 |
| WO | WO 2021/239547 | * | 12/2021 | ............. C08G 73/02 |

OTHER PUBLICATIONS

Search Report and Written Opinion in PCTEP2021062327; dated Jul. 27, 2021.

* cited by examiner

LIQUID LAUNDRY COMPOSITION

FIELD OF THE INVENTION

The present invention relates to a liquid laundry composition comprising a certain amphoterically-modified oligopropyleneimine ethoxylate and use of said composition for removing soils from fabrics, especially particulate soils.

BACKGROUND OF THE INVENTION

Laundry liquids are still in the field of active research and development. Nowadays, consumers are increasingly aware of the environmental impact and greenhouse gas emission, hence more and more people move to lower washing temperatures and shorter cycles. Meanwhile, they are seeking laundry products with environmental credentials that can provide improved cleaning performance under those milder washing conditions.

Since laundry liquids typically comprise surfactants, one route to meet the above requirements is to introduce highly weight efficient ingredients that can work in tandem with those surfactants. Those ingredients can partly replace the surfactants and aid the cleaning performance of the remaining surfactants. As a result, more laundry can be cleaned with the same amount of active chemicals or less chemicals are needed to remove the same amount of dirt and stains. Suitable ingredients that have been researched extensively are polymers with cleaning functions, for example, an antiredeposition polymer that can aid the surfactant systems in removing soils from fabrics.

WO03/015906A1 relates to novel oligomeric hydrophobic dispersants and laundry detergent compositions comprising oligomeric dispersants. It describes in one of the embodiments a suitable dispersant for use in the dispersant systems of the invention including a polyalkyleneimine.

EP1865050B1 describes a composition suitable for treating soiled fabrics comprising a hypohalite bleach and a soil suspending agent selected from the group consisting of an ethoxylated diamine, an ethoxylated polyamine, an ethoxylated amine polymer and mixtures thereof.

EP2961821B1 describes the use of alkoxylated polypropyleneimines selected from those with a linear polypropyleneimine backbone with a molecular weight Mn in the range of from 300 to 4000 g/mol for laundry care. It also describes a detergent composition comprising at least one said polymer, at least one anionic surfactant and at least one builder selected from citrate, phosphates, silicates, carbonates, phosphonates, amino carboxylates and polycarboxylates. A process for making said detergent composition is also described.

Despite all the prior art, there remains a persistent need to improve the effectiveness of antiredeposition polymers with respect to soil removal, especially the removal of particulate soils. Furthermore, it has been found that the inclusion of such antiredeposition polymer may reduce the viscosity of the resulting liquids, leading to reduced consumer acceptability and hence the need to include additional viscosity-boosting technology.

Therefore, it is an objective of the present invention to provide a liquid laundry composition comprising an antiredeposition polymer that can offer improved removal of soils. A further objective of the present invention is to provide a liquid laundry composition with improved removal of soils without compromising the viscosity profile of said composition. A still further objective is to provide such a composition with reduced overall level of chemicals.

Surprisingly, it has been found that a certain antiredeposition polymer, namely an amphoterically-modified oligopropyleneimine ethoxylate, can provide the desired improvement of soil removal when applied from a laundry liquid. In addition, said benefit can be achieved without compromising product viscosity.

SUMMARY OF THE INVENTION

In a first aspect of the present invention, there is provided a liquid laundry composition comprising: (i) from 1 to 60 wt % of one or more surfactants selected from non-soap anionic surfactants, nonionic surfactants, and mixtures thereof; and (ii) from 0.05 to 10 wt % of an amphoterically-modified oligopropyleneimine ethoxylate having a following formula (I)

(I)

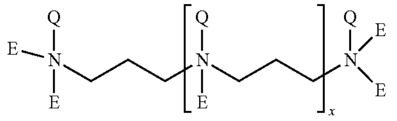

wherein E is an ethoxy side chain corresponding to a formula —$(RO)_n$—R' (I) in which R units are ethylene; n has an average value from 5 to 50, preferably from 10 to 40; R' units are each independently selected from hydrogen and $SO_3^-$, wherein at least 30% of R' units, preferably at least 50%, are $SO_3^-$; Q units are each independently selected from $C_1$-$C_4$ alkyl, H and a free electron pair, wherein at least 50% of Q units, preferably at least 80%, more preferably at least 90% are $C_1$-$C_4$ alkyl; and x ranges from 1 to 3.

In a second aspect of the present invention, there is provided use of a composition according to the first aspect of the invention, for removing soils from fabrics. There is also provided a method of removing soils from fabrics, comprising steps in sequence of: (a) diluting a dose of a composition according to the first aspect of the invention to obtain a wash liquor, wherein the dose is from 10 to 100 g; and (b) washing fabrics with the wash liquor so formed. Preferably, the soils are particulate soils.

In a third aspect of the present invention, there is provided a product comprising a composition according to the first aspect of the invention, wherein the composition is contained within a multidose pack, preferably a multidose pack with a dosing measure or within a unit dose pack made by polymeric film adapted to be insoluble until added to water.

These and other aspects, features and advantages will become apparent to those of ordinary skill in the art from a reading of the following detailed description and the appended claims.

DETAILED DESCRIPTION OF THE INVENTION

Any feature of one aspect of the present invention may be utilised in any other aspect of the invention. Any feature described as 'preferred' should be understood to be particularly preferred in combination with a further preferred feature or features. Herein, any feature of a particular embodiment may be utilized in any other embodiment of the invention. The word 'comprising' is intended to mean 'including' but not necessarily 'consisting of' or 'composed of'. In other words, the listed steps or options need not be exhaustive. The examples given in the description below are intended to clarify the invention but not to limit the invention. All percentages are weight percentages based upon the total weight of the composition unless otherwise indicated. Except in the operating and comparative examples, or where otherwise explicitly indicated, all numbers in this description indicating amounts of material or conditions of reaction, physical properties or materials and/or use are to be understood as modified by the word 'about'. Numerical ranges expressed in the format 'from x to y' are understood to include x and y, unless specified otherwise. When for a specific feature multiple preferred ranges are described in the format 'from x to y', it is understood that all ranges combining the different endpoints are also contemplated.

An oligopropyleneimine ethoxylate of the invention is amphoterically modified, conforming to the following formula (I)

(I)

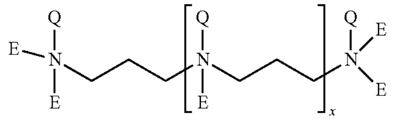

wherein E is an ethoxy side chain corresponding to a formula —$(RO)_n$—R' (I) in which R units are ethylene; n has an average value from 5 to 50; R' units are each independently selected from hydrogen and $SO_3^-$, wherein at least 30% of R' units are $SO_3^-$; Q units are each independently selected from $C_1$-$C_4$ alkyl, H and a free electron pair, wherein at least 50% of Q units are $C_1$-$C_4$ alkyl; and x ranges from 1 to 3.

The counterions of the quaternized nitrogen atoms in formula (I) can be $SO_3^-$ ions or alkyl sulfate ions ($C_1$-$C_4$ monoalkyl sulfates). It is understood by those skilled in the art that after optional neutralisation in the manufacturing process and/or optional dilution step with water, further anions and cations may be present together with the oligomer conforming to formula (I).

Preferably, at least 80% of all Q units are $C_1$-$C_4$ alkyl. More preferably at least 90% of all Q units are $C_1$-$C_4$ alkyl. Most preferably, from 93 to 97% of all Q units are $C_1$-$C_4$ alkyl.

Preferably, at least 50% of the R' units are $SO_3^-$.

Preferably, the ratio of Q=$C_1$-$C_4$ alkyl to R'=$SO_3^-$ is from 1:1 to 1:0.8.

Preferably, x is 2 or 3.

Preferably, at least 90% of all Q units are methyl and/or x is 2 or 3.

Preferably, n has an average value from 10 to 40, more preferably from 15 to 30.

Preferably, x is 2, and/or n has an average value from 15 to 30, and/or at least 90% of all Q units are methyl.

In some preferred embodiments, x=1, 2 or 3, at least 80% of Q units are $C_1$-$C_4$ alkyl, and the ratio of Q=$C_1$-$C_4$ alkyl to R'=$SO_3^-$ is from 1:1 to 1:0.8.

In further preferred embodiments, at least 90% of all Q units are methyl, x is 2 or 3, and the ratio of Q=methyl to R'=$SO_3^-$ is from 1:1 to 1:0.8.

In still further preferred embodiments, x is 2, at least 90% of all Q units are $C_1$-$C_4$ alkyl, preferably $C_1$, n has an average value of 15 to 30 and Q=$C_1$-$C_4$ alkyl to R'=$SO_3^-$ is from 1:1 to 1:0.8.

Mixtures of any of the above described materials may also be used.

Preferably, the liquid laundry composition according to the present invention comprises an amphoterically-modified oligopropyleneimine ethoxylate conforming to formula (I) wherein x=2, and one or more isomeric compounds of the following formula (II)

(II)

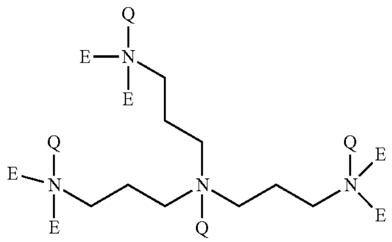

wherein E is an ethoxy side chain corresponding to a formula —$(RO)_n$—R' (I) in which R units are ethylene; n has an average value from 5 to 50; R' units are each independently selected from hydrogen and $SO_3^-$, wherein at least 30% of R' units, preferably at least 50%, are $SO_3^-$; and Q units are each independently selected from $C_1$-$C_4$ alkyl, H and a free electron pair, wherein at least 50% of Q units, preferably at least 80%, more preferably at least 90%, are $C_1$-$C_4$ alkyl.

Preferably, in a composition according to the present invention, the molar ratio of the amphoterically-modified oligopropyleneimine ethoxylate of formula (I) to the isomeric compound of formula (II) is at least 10:1.

Preferably, the composition according to the present invention further comprises a sulfate of an alkali metal and/or an amine. A typical example is a sulfate salt of an amine, such as a sulfate salt of an alkanolamine.

The amphoterically-modified oligopropyleneimine ethoxylate conforming to formula (I) can be produced by a process in sequence of (a) providing an amine selected from ammonia, 1,3-propylendiamine, bis-(3,3'-aminopropyl) amine, bis-(3,3'-aminopropyl)-1,3-propylenediamine, and mixtures thereof, (b) optionally cyanoethylation of said amine with acrylonitrile in a ratio from 100:1 to 1:2.5, preferably from 10:1 to 1:2.5, more preferably from 3:1 to 1:2.1, followed by hydrogenation, to obtain oligopropyleneimines with 2, 3 and 4 repeating units, (c) optionally purification of the oligopropyleneimine from step (b), (d) ethoxylation of said amine and/or oligopropyleneimine from step a, b or c, and, (e) at least partial quaternization and transsulfation with a di-C1-C4-alkyl sulfate.

Preferably, the purification step (c) is performed to obtain oligopropyleneimines with 2, 3 and 4 repeating units and mixtures thereof with a purity of at least 80 wt %, preferably at least 90 wt %. Preferably, the ethoxylation step (d) is performed in two sub-steps, viz. (d.1) conversion with up to one mole of EO per N—H functional group, followed by (d.2) conversion with more EO under alkaline catalysis. Preferably, the quaternization in step (e) is performed with dimethyl sulfate. Preferably, the transsulfation in step (e) is performed with sulfuric acid as a catalyst. Preferably, the transsulfation in step (e) is performed quantitatively (>=80%) and a slightly cationic or net neutral oligomer is obtained.

The process may additionally include a subsequent step of neutralization of the sulfuric acid with a base selected from alkali metal hydroxides and amines. Preferably, a base selected from amines, more preferably alkanolamines, or aqueous solutions thereof may be used.

The process steps (a) to (c) may be performed via either Route A or Route B.

Route A: one equivalent of acrylonitrile may be added dropwise to an excess of either 1,3-propylenediamine, bis-(3,3'-aminopropyl)amine, or bis-(3,3'-aminopropyl)-1,3-propylenediamine, or mixtures thereof (up to 100 equivalents), optionally dissolved in a solvent, in a reaction vessel at a temperature between 5° C. and 80° C., as described in CN107311891. Upon complete addition, the reaction may be stirred at the indicated temperature until the starting materials were fully consumed and then cooled to room temperature. After optional purification, the crude mixture may be subjected to a hydrogenation in a pressure reactor catalyzed by a [Cu], [Co], [Ni], [Pd], [Pt] or [Ru] catalyst with or without solvent at elevated hydrogen and optionally ammonia pressures, as described in DD238043 and/or JP08333308 and/or WO2018046393. During the hydrogenation, the temperature may be between 70° C. and 200° C., preferably between 70° C. and 150° C., and the hydrogen pressure between 1 and 250 bar, preferably between 50 and 250 bar. The catalyst may be removed, for example by filtration, and volatiles may be removed under reduced pressure. The obtained mixture of the desired oligoamino compounds may be then separated in the next step via distillation under reduced pressure (<1 bar) to yield the purified target compounds, bis-(3,3'-aminopropyl)amine, bis-(3,3'-aminopropyl)-1,3-propylenediamine or tris-(3,3',3"-aminopropyl)-1,3-propylenediamine.

Route B: acrylonitrile (up to 2.5 equivalents) may be added dropwise to one equivalent of either ammonia, 1,3-propylenediamine, bis-(3,3'-aminopropyl)amine, or bis-(3,3'-aminopropyl)-1,3-propylenediamine, or mixtures thereof, optionally dissolved in a solvent, in a reaction vessel at a temperature between 5° C. and 80° C., as described in CN102941160 and/or WO9214709. Upon complete addition reaction, the reaction may be stirred at the indicated temperature until the starting materials were fully consumed and then cooled to room temperature. After optional purification the crude mixture may be subjected to a hydrogenation in a pressure reactor catalyzed by a [Cu], [Co], [Ni], [Pd], [Pt] or [Ru] catalyst with or without solvent at elevated hydrogen and optionally ammonia pressures, as described in DD238043 and/or JP08333308 and/or WO 2018046393. During the hydrogenation, the temperature may be between 70° C. and 200° C., preferably between 70° C. and 150° C., and the hydrogen pressure between 1 and 250 bar, preferably between 50 and 250 bar. The catalyst may be removed, for example by filtration, and volatiles may be removed under reduced pressure. The obtained mixture of the desired oligoamino compounds may be then separated in the next step via distillation under reduced pressure (<1 bar) to yield the purified target compounds, bis-(3,3'-aminopropyl)amine, bis-(3,3'-aminopropyl)-1,3-propylenediamine or tris-(3,3',3"-aminopropyl)-1,3-propylenediamine.

The crude mixture according to route (A) or (B) contains predominantly (>50 mol %) linear oligoamines, preferably more than 70 mol %, more preferably more than 80 mol % linear oligoamines. Preferably, the crude mixture according to route (A) or (B) is purified by distillation, to remove any impurities from monomers, other oligomers or branched structures and branched isomers, respectively, to obtain the linear target compounds, bis-(3,3'-aminopropyl)amine, bis-(3,3'-aminopropyl)-1,3-propylenediamine or tris-(3,3',3"-aminopropyl)-1,3-propylenediamine, or mixtures thereof, with a purity of at least 80 wt %, more preferably at least 90 wt % and even more preferably >95 wt %. In one embodiment, the oligoamines may additionally contain an isomeric compound which after ethoxylation and amphoterically modification, corresponds to the formula (II) as previously described.

Step (d) of the process may be performed as follows. The ethylene oxide is added in a first step (i) of process step (d) in an amount of 0.2 to 1.0 ethylene oxide units per NH-group of the oligopropyleneimine (PPI), preferably 0.5 to 0.99, more preferably 0.6 to 0.95 ethylene oxide units per NH-group of the oligopropyleneimine (PPI), even more preferably 0.70 to 0.95 ethylene oxide units per NH-group of the oligopropyleneimine (PPI) (under-hydroxyethylation). In a preferred embodiment, the minimum amount of ethylene oxide units per NH-group added in step (i) is at least identical to the amount of basic catalyst C added later in step (ii), or higher, in order to prevent formation of polyethylene glycol via direct reaction of catalyst C with ethylene oxide during step (ii). Preferably, the sum of the amounts of ethylene oxide EO added in steps (i) and (ii) lies in the range of 5 to 50 ethylene oxide units per NH-group of the oligopropyleneimine (PPI), more preferably 10 to 40 ethylene oxide units per NH-group of the oligopropyleneimine (PPI), further preferably 15 to 30 ethylene oxide units per NH-group of the oligopropyleneimine (PPI). Preferably, the first step (i) of process step (d) is carried out in the absence of a basic catalyst. Preferably, water may be added in step (i). In one embodiment, the second step (ii) of step (d) is carried out in the presence of a basic catalyst. Suitable bases are such as LIOH, NaOH, KOH, CsOH and mixtures thereof, sodium or potassium alkoxides such as potassium methylate ($KOCH_3$), potassium tert-butoxide, sodium methylate ($NaOCH_3$), sodium n-hexanolate and sodium ethoxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides, further preference being given to potassium hydroxide and sodium hydroxide, and to alkali metal alkoxides, still further preference being given to potassium methylate ($KOCH_3$) and sodium methylate ($NaOCH_3$). Particular preference is given to potassium hydroxide and to potassium methylate ($KOCH_3$). Typical use amounts for the base, for example KOH, are from 0.02 to 10% by weight, in particular from 0.05 to 1% by weight, relative to the ethoxylated oligopropyleneimine (EPPI). In a preferred embodiment, the basic catalyst C is only used in the second step (ii) and is selected from the group consisting of alkaline earth metal containing basic catalysts. A specifically preferred basic catalyst is KOH; KOH may be used as a solution in water. In an embodiment, the basic catalyst C is added in an amount of 0.05 to 0.3% by weight, preferably 0.15 to 0.25% by weight, relative to the ethoxylated oligopropyleneimine (EPPI).

In an embodiment, the temperature during the first step (i) of step (d) is in the range of 90° C. to 160° C., preferably 100° C. to 150° C., more preferably 110° C. to 140° C. In an embodiment, the temperature during the second step (ii) of step (d) is in the range of 100° C. to 180° C., preferably 120° C. to 160° C., more preferably 120° C. to 145° C. Higher temperatures than specified above during the alkoxylation steps are also possible, but are not preferred, since they usually lead to (more) colored products. Preferably, the first step (i) of step (d) may be carried out at a total pressure of up to 15 bar, preferably up to 10 bar, for example 1 to 6 bar. Preferably, second step (ii) of step (d) may be carried out at a total pressure of up to 15 bar, preferably up to 10 bar, for example 2 to 10 bar. Preferred vessels for carrying out the reaction are autoclaves and tubular reactors. The reaction during the second step (ii) of step (d) can be interrupted at different intermediates (i.e. alkoxylation degrees) and can be continued with or without additional catalyst addition.

The product obtained after step (ii) of step (d), i.e. ethoxylated oligopropyleneimine (EPPI), may be treated with a bleaching agent. The bleaching agent is preferably selected from the group consisting of borates, hypochlorites, borohydrates and hydrogen peroxide.

The quaternization and transsulfation step (e) may be a process based on a combination of quaternization of the amino groups in the backbone of the EPPI and sulfation of the terminal hydroxyl moieties of the polyethylene oxide side chains. In a more general view, the quaternization and transsulfation step (e) is comprising a sub-step (e1) which forms a sulfating species (=quaternization) and a sub-step (e2) which provides controllable sulfation of one or more hydroxyl moieties (=transsulfation). The first required sub-step (e1) of the process can be conducted under basic or close to pH-neutral conditions. The second sub-step (e2) of the process can be conducted under acidic conditions.

Sub-step (e1) (quaternization): Preferably from 0.5 to 1.0 equivalent of a sulfating agent, more preferably from 0.8 to 0.99 equivalent and most preferably from 0.9 to 0.99 equivalent are reacted with one tertiary amino group of the ethoxylated oligopropyleneimine, to form quaternary ammonium ions in the oligoamine backbone and an equal amount of sulfating species. If desired the process may be conducted in the presence of a solvent, preferably non-reactive solvents like toluene, glyme or diglyme may be used. The preferred sulfating agent according to the present invention are dialkyl sulfates, preferably di-$C_1$-$C_4$-alkyl sulfate, more preferably di-$C_1$-$C_2$alkyl sulfate and most preferably dimethyl sulfate. Sub-step (e1) is conducted under basic or close to pH-neutral conditions, at a temperature of 0° C. to 180° C., preferably 40° C. to 100° C. and even more preferably 50° C. to 90° C. The reaction when exothermic can be controlled by any suitable means, e.g. by cooling the reaction vessel or by providing a reflux condenser.

Sub-step (e2) (transsulfation): One equivalent of a sulfating species is required per hydroxyl moiety which is to be sulfated. The number of sulfating species is identical to the number of quaternary ammonium ions in the oligoamine backbone. Depending on the degree of conversion during the transsulfation step, the obtained product after sub-step (e2) will be an amphoterically-modified polymer with either (i) a net charge of zero (=neutral polymer), i.e. identical number of quaternary ammonium ions in the oligoamine backbone and sulfated hydroxyl groups, in case of a full (100%) conversion of the sulfating species during the transsulfation step; Or (ii) a positive net charge (=slightly cationic polymer), i.e. slightly higher number of quaternary ammonium ions in the oligoamine backbone in comparison to sulfated hydroxyl groups, in case of an only partial (<100%) conversion during the transsulfation step. In order to control the degree of conversion during the transsulfation step, the formulator can remove the alcohol, preferably the $C_1$-$C_4$-alcohol, most preferably methanol (depending on the type of di-$C_1$-$C_4$-alkyl sulfate employed in step (e1)), which is formed as by-product. In fact, the relative amount of alcohol by-product which is removed can be used as a tool to control the degree of conversion of the transsulfation step. Any process which is convenient to the formulator, e.g. distillation, absorption into a molecular sieve, crystallization or precipitation, may be used, preferably distillation. In many instances, removal of the by-product alcohol already during the reaction will be preferred, preferably by distillation.

The final product after sub-step (e2) is usually obtained as an internal zwitterion with potentially additional cationic charge in case of incomplete conversion (<100%) of the sulphating species during the transsulfation step. The counterions of the quaternized nitrogen atoms are $SO_3^-$ ions leading to the formation of the internal zwitterions, and potentially additional alkyl sulfate ions ($C_{1-4}$ monoalkyl sulfates), preferably methyl sulfate ions, in case of incomplete conversion during the transsulfation step.

Sub-step (e2) can be conducted under acidic conditions. Suitable acids are, inter alia, sulfuric acid, hydrochloric acid, methanesulfonic acid or Lewis acids (e.g. boron trifluoride). Preferably sulfuric acid is employed. The acid may be added in any amount sufficient to form the desired product, however, the process is conducted at a pH less than about 6, preferably less than about 4, more preferably less than about 3 and most preferably at a pH around 2. In fact, acid levels from about 0.01 to 1 molar ratio relative to the ethoxylated oligopropyleneimine are preferred. The catalyst can be introduced by any manner which is convenient to the formulator, however, good mixing should be utilized. Alternatively, the acid may be generated in situ by adding excess sulfating agent and allowing this excess agent to react with a limited source of proton, inter alia, water. Sub-step (e2) of the process of the present invention can be conducted at a temperature of 0° C. to 200° C., preferably 40° C. to 150° C. and even more preferably 70° C. to 120° C. The reaction when exothermic can be controlled by any suitable means, e.g. by cooling the reaction vessel or by providing a reflux condenser. The use of sulfuric acid may lead to additional sulfation of hydroxyl groups of the ethoxylated oligopropyleneimine as a side-reaction to a minor extent, besides the conversion of hydroxyl groups to sulfate groups from the transsulfation process (i.e. via the employed di-$C_1$-$C_4$-alkyl sulfate).

The final product after sub-step (e2) may be further purified to remove volatile by-products and/or the acidic catalyst, preferably the sulfuric acid, or may be isolated as a mixture. Volatile by-products, e.g. 1,4-dioxane, may be removed, e.g. via distillation or stripping under vacuum. In case that the acidic catalyst is not remove from the final product after sub-step (e2), the mixture may be isolated as such or the acidic catalyst may be neutralized. Preferably, the acidic catalyst is not removed, but neutralized. Any suitable base may be used to neutralize the acidic, inter alia, ammonium hydroxide, lithium hydroxide, sodium hydroxide, potassium hydroxide, magnesium hydroxide, calcium hydroxide, barium hydroxide or amines. Preferably, lithium hydroxide, sodium hydroxide, potassium hydroxide or amines are being used, even more preferably sodium hydroxide, alkanolamines or aqueous solutions thereof. Preferably, alkanolamines are used for the neutralization of the acidic catalyst. In case the employed acid is sulfuric acid, the sulfate salt of an alkanolamine is formed and the amphoterically-modified oligopropyleneimine ethoxylates according to formula (I) of the invention are finally obtained in a mixture additionally comprising the sulfate salt of an alkanolamine and water, if aqueous solutions of the bases are used.

The finally obtained amphoterically-modified oligopropyleneimine ethoxylates of formula (I) can have a weight-average molecular weight (determined by GPC, cf. experimental part) of 1000 to 20000 g/mol, preferably 1500 to 15000 g/mol, more preferred 2000 to 10000 g/mol and most preferably 2500 to 8000 g/mol.

The final product after sub-step (e2), if applicable after removal or neutralization of the acidic catalyst, may be mixed with water in a weight ratio ranging from 100:1 to 1:100. Preferably, the final product after sub-step (e2) is mixed with 1 to 80 wt % water, more preferably 1 to 60 wt % water, even more preferably 5 to 50 wt % water and most preferably 10 to 40 wt % water, in order to lower the viscosity and to improve the handling. Herein, all weight percentages of the water are relative to the total weight of the mix.

An optional step of work-up may also include the adjustment of the pH of the final product, especially if the product is obtained as aqueous solution. Any suitable base or acid may be used to adjust the pH. Preferably, sodium hydroxide, potassium hydroxide or amines are being used as base; Sulfuric acid, hydrochloric acid or methanesulfonic acid as acid. In one embodiment of the present invention, alkanolamines are being used to adjust the pH. A neutral to slightly alkaline pH of the aqueous solution of the inventive polymer is preferred to protect the sulfate groups from being hydrolyzed and cleaved to free hydroxyl groups. Therefore, the pH of the final product in water is preferably adjusted to pH 6 to 14, more preferably to pH 6 to 11 and even more preferably to pH 7 to 10. Furthermore, antimicrobial agents may be added to improve the preservation of the aqueous solution of the final product. Preferably, 2-phenoxyethanol (CAS-no. 122-99-6, for example Protectol® PE available from BASF) or 4,4'-dichloro-2-hydroxydiphenylether (CAS: 3380-30-1), and combinations thereof, are being used. The 4,4'-dichloro-2-hydroxydiphenylether may be used as a solution, for example a solution of 30 wt % of 4,4'-dichloro-2-hydroxydiphenylether in 1,2-propyleneglycol, e.g. Tinosan® HP 100 available from BASF. The antimicrobial agent may be added in a concentration of 0.0001 to 10%. Preferably, the antimicrobial agents are 2-phenoxyethanols in a concentration of 0.01 to 5%, more preferably 0.1 to 2% and/or 4,4'-dichloro 2-hydroxydiphenyl ethers in a concentration of 0.001 to 1%, more preferably 0.002 to 0.6%. Herein, All concentrations are relative to the total weight of the oligomer conforming to formula (I).

In a liquid laundry composition of the invention, the level of the amphoterically-modified oligopropyleneimine ethoxylate conforming to formula (I) ranges from 0.05 to 10 wt %, preferably from 0.10 to 5 wt %, more preferably from 0.15 to 3 wt %.

The term "laundry composition" in the context of this invention denotes formulated compositions intended for and capable of wetting and cleaning domestic laundry such as clothing, linens and other household textiles. The term "linen" is often used to describe certain types of laundry items including bed sheets, pillow cases, towels, tablecloths, table napkins and uniforms. Textiles can include woven fabrics, non-woven fabrics, and knitted fabrics; and can include natural or synthetic fibres such as silk fibres, linen fibres, cotton fibres, polyester fibres, polyamide fibres such as nylon, acrylic fibres, acetate fibres, and blends thereof including cotton and polyester blends.

Examples of liquid laundry compositions include heavy-duty liquid laundry compositions for use in the wash cycle of automatic washing machines, as well as liquid fine wash and liquid colour care compositions such as those suitable for washing delicate garments (e.g. those made of silk or wool) either by hand or in the wash cycle of automatic washing machines.

The term "liquid" in the context of this invention denotes that a continuous phase or predominant part of the composition is liquid and that the composition is flowable at 15° C. and above. Accordingly, the term "liquid" may encompass emulsions, suspensions, and compositions having flowable yet stiffer consistency, known as gels or pastes. The viscosity of the composition may suitably range from 200 to 10,000 mPa·s at 23° C., measured by a rotational rheometer Rheolab QC (Anton Paar Ostfildem, Germany) with spindle CC27 at shear rate from 0 to 1200/s. Pourable liquid detergent compositions generally have a viscosity of from 200 to 2,500 mPa·s, preferably from 200 to 1500 mPa·s. Uquid detergent compositions which are pourable gels generally have a viscosity of from 1,500 mPa·s to 6,000 mPa·s, preferably from 1,500 mPa·s to 2,000 mPa·s.

The composition of the invention may generally comprise from 3 to 95 wt %, preferably from 10 to 90 wt %, more preferably from 15 to 85 wt % of water. The composition may also incorporate non-aqueous carriers such as hydrotropes, co-solvents and phase stabilizers. Such materials are typically low molecular weight, water-soluble or water-miscible organic liquids such as C1 to C5 monohydric alcohols (such as ethanol and n- or i-propanol); C2 to C6 diols (such as monopropylene glycol and dipropylene glycol); C3 to C9 triols (such as glycerol); polyethylene glycols having a weight average molecular weight ($M_w$) ranging from about 200 to 600; C1 to C3 alkanolamines such as mono-, di- and triethanolamines; and alkyl aryl sulfonates having up to 3 carbon atoms in the lower alkyl group (such as the sodium and potassium xylene, toluene, ethylbenzene and isopropyl benzene (cumene) sulfonates). Mixtures of any of the above described materials may also be used.

Non-aqueous carriers, when included, may be present in an amount ranging from 0.1 to 20 wt %, preferably from 1 to 15 wt %, and more preferably from 3 to 12 wt %.

The composition of the invention preferably has a pH in the range of 5 to 9, more preferably 6 to 8, when measured on dilution of the composition to 1% using demineralized water.

The composition of the invention comprises from 1 to 60 wt % of one or more surfactants selected from non-soap anionic surfactants, nonionic surfactants, or mixtures thereof.

Non-soap anionic surfactants of the invention are typically salts of organic sulfates and sulfonates having alkyl radicals containing from 8 to 22 carbon atoms, the term "alkyl" being used to include the alkyl portion of higher acyl radicals. Examples of such materials include alkyl sulfates, alkyl ether sulfates, alkaryl sulfonates, alpha-olefin sulfonates and mixtures thereof. The alkyl radicals preferably contain from 10 to 18 carbon atoms and may be unsaturated. The alkyl ether sulfates may contain from one to ten ethylene oxide or propylene oxide units per molecule, and preferably contain one to three ethylene oxide units per molecule. The counterion for anionic surfactants is generally an alkali metal such as sodium or potassium; or an ammoniacal counterion such as monoethanolamine, (MEA) diethanolamine (DEA) or triethanolamine (TEA). Mixtures of such counterions may also be employed.

A preferred class of non-soap anionic surfactant of the invention includes alkylbenzene sulfonates, particularly linear alkylbenzene sulfonates (LAS) with an alkyl chain length of from 10 to 18 carbon atoms. Commercial LAS is a mixture of closely related isomers and homologues alkyl chain homologues, each containing an aromatic ring sulfonated at the "para" position and attached to a linear alkyl chain at any position except the terminal carbons. The linear alkyl chain typically has a chain length of from 11 to 15 carbon atoms, with the predominant materials having a chain length of C12. Each alkyl chain homologue consists of a mixture of all the possible sulfophenyl isomers except for the 1-phenyl isomer. LAS is normally formulated into compositions in acid (i.e. HLAS) form and then at least partially neutralized in-situ.

Also suitable are alkyl ether sulfates having a straight or branched chain alkyl group having 10 to 18, more preferably 12 to 14 carbon atoms and containing an average of 1 to 3EO units per molecule. A preferred example is sodium lauryl ether sulfate (SLES) in which the predominantly C12 lauryl alkyl group has been ethoxylated with an average of 3EO units per molecule.

Some alkyl sulfate surfactant (PAS) may be used, such as non-ethoxylated primary and secondary alkyl sulphates with an alkyl chain length of from 10 to 18.

Mixtures of the above described materials may also be used.

A preferred mixture of non-soap anionic surfactants of the invention comprises (ai) linear alkylbenzene sulfonate (preferably $C_{11}$ to $C_{15}$ linear alkyl benzene sulfonate) and (aii) alkyl ether sulfate (preferably $C_{10}$ to $C_{15}$ alkyl sulfate ethoxylated with an average of 1 to 3 EO).

The weight ratio of (ai)/(aii) preferably ranges from 20:1 to 1:20, more preferably from 10:1 to 1:10, still more preferably from 4:1 to 1:4.

In a composition of the invention, the total level of non-soap anionic surfactant may suitably range from 5 to 30 wt %, preferably from 8 to 25 wt %, more preferably from 10 to 20 wt %.

Nonionic surfactants of the invention are typically polyoxyalkylene compounds, i.e. the reaction product of alkylene oxides (such as ethylene oxide or propylene oxide or mixtures thereof) with starter molecules having a hydrophobic group and a reactive hydrogen atom which is reactive with the alkylene oxide. Such starter molecules include alcohols, acids, amides or alkyl phenols. Where the starter molecule is an alcohol, the reaction product is known as an alcohol alkoxylate. The polyoxyalkylene compounds can have a variety of block and heteric (random) structures. For example, they can comprise a single block of alkylene oxide, or they can be diblock alkoxylates or triblock alkoxylates. Within the block structures, the blocks can be all ethylene oxide or all propylene oxide, or the blocks can contain a heteric mixture of alkylene oxides. Examples of such materials include aliphatic alcohol ethoxylates such as $C_8$ to $C_{18}$ primary or secondary linear or branched alcohol ethoxylates with an average of from 2 to 40 moles of ethylene oxide per mole of alcohol.

A preferred class of nonionic surfactant of the invention includes aliphatic $C_8$ to $C_{18}$, more preferably $C_{12}$ to $C_{15}$ primary linear alcohol ethoxylates with an average of from 3 to 20, more preferably from 5 to 10 moles of ethylene oxide per mole of alcohol.

Mixtures of any of the above described materials may also be used.

In a composition of the invention, the total level of nonionic surfactant may suitably range from 0.2 to 25 wt %, preferably from 1 to 15 wt %, more preferably from 2 to 10 wt %.

Preferably, the total amount of non-soap anionic surfactants and nonionic surfactants in a composition of the invention ranges from 5 to 40 wt %, more preferably from 10 to 30 wt %, most preferably from 15 to 20 wt %.

Preferably, the weight ratio of non-soap anionic surfactants to nonionic surfactants in a composition ranges from 20:1 to 1:20, more preferably from 10:1 to 1:10 and most preferably from 5:1 to 1:5.

A particularly preferred composition of the invention comprises: (i) from 2 to 25 wt % of one or more linear alkylbenzene sulfonates (preferably $C_{11}$ to $C_{15}$ linear alkyl benzene sulfonates), (ii) from 2 to 20 wt % of one or more alkyl ether sulfates (preferably $C_{10}$ to $C_{18}$ alkyl sulfates ethoxylated with an average of 1 to 3 EO) and/or from 2 to 25 wt % of one or more nonionic surfactants which are aliphatic alcohol ethoxylates (preferably $C_{12}$ to $C_{15}$ primary linear alcohol ethoxylate with an average of from 5 to 10 moles of ethylene oxide per mole of alcohol). In such preferred composition, the weight ratio of said anionic surfactants to said nonionic surfactants may suitably range from 20:1 to 1:20, preferably from 10:1 to 1:10, more preferably from 5:1 to 1:5.

A composition of the invention may contain optional components to further enhance cleaning performance and/or consumer acceptability of viscosity.

A composition of the invention may contain one or more cosurfactants which are amphoteric (zwitterionic) and/or cationic surfactants, in addition to the non-soap anionic and/or nonionic surfactants described above.

Specific cationic surfactants include C8 to C18 alkyl dimethyl ammonium halides and derivatives thereof in which one or two hydroxyethyl groups replace one or two of the methyl groups, and mixtures thereof. Cationic surfactant, when included, may be present in an amount ranging from 0.1 to 5 wt %.

Specific amphoteric (zwitterionic) surfactants include alkyl amine oxides, alkyl betaines, alkyl amidopropyl betaines, alkyl sulfobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, having alkyl radicals containing from 8 to 22 carbon atoms, the term "alkyl" being used to include the alkyl portion of higher acyl radicals. Amphoteric (zwitterionic) surfactant, when included, may be present in an amount ranging from 0.1 to 5%. Mixtures of any of the above described materials may also be used.

A composition of the invention may contain one or more builders. Builders enhance or maintain the cleaning efficiency of the surfactant, primarily by reducing water hardness. This is done either by sequestration or chelation (holding hardness minerals in solution), by precipitation (forming an insoluble substance), or by ion exchange (trading electrically charged particles). In the context of the invention, no distinction is made between builders and such components elsewhere called 'co-builders' or 'chelating agents'. In addition to the benefit described above, the chelating agents may help to improve the stability of the composition and protect for example against transition metal catalysed decomposition of certain ingredients.

Builders for use in the invention can be of the organic or inorganic type, or a mixture thereof. Suitable inorganic builders include hydroxides, carbonates, sesquicarbonates, bicarbonates, silicates, phosphates, zeolites, and mixtures thereof. Specific examples of such materials include sodium and potassium hydroxide, sodium and potassium carbonate, sodium and potassium bicarbonate, sodium sesquicarbonate, sodium silicate and mixtures thereof. Suitable organic builders include polycarboxylates, in acid and/or salt form. When utilized in salt form, alkali metal (e.g. sodium and potassium) or alkanolammonium salts are preferred. Specific examples of such materials include sodium and potassium citrates, sodium and potassium tartrates, the sodium and potassium salts of tartaric acid monosuccinate, the sodium and potassium salts of tartaric acid disuccinate, sodium and potassium ethylenediaminetetraacetates, sodium and potassium N(2-hydroxyethyl)-ethylenediamine triacetates, sodium and potassium nitrilotriacetates and sodium and potassium N-(2-hydroxyethyl)-nitrilodiacetates. Polymeric polycarboxylates may also be used, such as polymers of unsaturated monocarboxylic acids (e.g. acrylic, methacrylic, vinylacetic, and crotonic acids) and/or unsaturated dicarboxylic acids (e.g. maleic, fumaric, itaconic, mesaconic and citraconic acids and their anhydrides). Specific examples of such materials include polyacrylic acid, polymaleic acid, and copolymers of acrylic and maleic acid. The polymers may be in acid, salt or partially neutralised form and may suitably have a molecular weight (Mw) ranging from about 1,000 to 100,000, preferably from about 2,000 to about 85,000, and more preferably from about 2,500 to about 75,000.

Other suitable builders which may be referred to as ‘chelating agents’ include phosphonates, in acid and/or salt form. When utilized in salt form, alkali metal (e.g. sodium and potassium) or alkanolammonium salts are preferred. Specific examples of such materials include aminotris(methylene phosphonic acid) (ATMP), 1-hydroxyethylidene diphosphonic acid (HEDP) and diethylenetriamine penta (methylene phosphonic acid (DTPMP) and their respective sodium or potassium salts. HEDP is preferred.

Mixtures of any of the above described materials may also be used.

Preferred builders of the invention may be selected from citrates, phosphates, silicates, carbonates, phosphonates, amino carboxylates, polymeric polycarboxylates, or mixtures thereof. Builders, when included, may be present in an amount ranging from 0.1 to 10 wt %, preferably from 0.5 to 8 wt %, more preferably from 1 to 5 wt %.

A composition of the invention may in some cases contain one or more fatty acids and/or salts thereof.

Suitable fatty acids in the context of this invention include aliphatic carboxylic acids of formula RCOOH, where R is a linear or branched alkyl or alkenyl chain containing from 6 to 24, more preferably 10 to 22, most preferably from 12 to 18 carbon atoms and 0 or 1 double bond. Preferred examples of such materials include saturated C12-18 fatty acids such as lauric acid, myristic acid, palmitic acid or stearic acid; and fatty acid mixtures in which 50 to 100% (by weight based on the total weight of the mixture) consists of saturated C12-18 fatty acids. Such mixtures may typically be derived from natural fats and/or optionally hydrogenated natural oils (such as coconut oil, palm kernel oil or tallow). The fatty acids may be present in the form of their sodium, potassium or ammonium salts and/or in the form of soluble salts of organic bases, such as mono-, di- or triethanolamine. Mixtures of any of the above described materials may also be used.

Fatty acids and/or their salts, when included, may be present in an amount ranging from 0.25 to 15 wt %, more preferably from 0.5 to 5 wt %, most preferably from 0.75 to 4 wt %.

For formula accounting purposes, in the formulation, fatty acids and/or their salts (as defined above) are not included in the level of surfactant or in the level of builder.

A composition of the invention will preferably include one or more soil release polymers (SRPs) which help to improve the detachment of soils from fabric by modifying the fabric surface during washing. The adsorption of a SRP over the fabric surface is promoted by an affinity between the chemical structure of the SRP and the target fibre.

SRPs for use in the invention may include a variety of charged (e.g. anionic) as well as non-charged monomer units and structures may be linear, branched or star-shaped. The SRP structure may also include cOPPing groups to control molecular weight or to alter polymer properties such as surface activity. The weight average molecular weight ($M_w$) of the SRP may suitably range from about 1000 to about 20,000 and preferably ranges from about 1500 to about 10,000.

SRPs for use in the invention may suitably be selected from copolyesters of dicarboxylic acids (for example adipic acid, phthalic acid or terephthalic acid), diols (for example ethylene glycol or propylene glycol) and polydiols (for example polyethylene glycol or polypropylene glycol). The copolyester may also include monomeric units substituted with anionic groups, such as for example sulfonated isophthaloyl units. Examples of such materials include oligomeric esters produced by transesterification/oligomerization of poly(ethyleneglycol) methyl ether, dimethyl terephthalate (“DMT”), propylene glycol (“PG”) and poly(ethyleneglycol) (“PEG”); partly- and fully-anionic-end-capped oligomeric esters such as oligomers from ethylene glycol (“EG”), PG, DMT and Na-3,6-dioxa-8-hydroxyoctanesulfonate; nonionic-capped block polyester oligomeric compounds such as those produced from DMT, Me-capped PEG and EG and/or PG, or a combination of DMT, EG and/or PG, Me-capped PEG and Na-dimethyl-5-sulfoisophthalate, and copolymeric blocks of ethylene terephthalate or propylene terephthalate with polyethylene oxide or polypropylene oxide terephthalate Other types of SRP for use in the invention include cellulosic derivatives such as hydroxyether cellulosic polymers, $C_1$-$C_4$ alkylcelluloses and C4 hydroxyalkyl celluloses; polymers with poly(vinyl ester) hydrophobic segments such as graft copolymers of poly(vinyl ester), for example $C_1$-$C_6$ vinyl esters (such as poly(vinyl acetate)) grafted onto polyalkylene oxide backbones; poly(vinyl caprolactam) and related co-polymers with monomers such as vinyl pyrrolidone and/or dimethylaminoethyl methacrylate; and polyester-polyamide polymers prepared by condensing adipic acid, caprolactam, and polyethylene glycol.

Preferred SRPs for use in the invention include copolyesters formed by condensation of terephthalic acid ester and diol, preferably 1,2 propanediol, and further comprising an end cap formed from repeat units of alkylene oxide capped with an alkyl group. Examples of such materials have a structure corresponding to general formula (III):

(III)

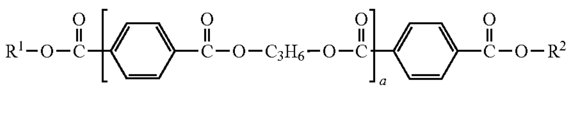

in which $R^1$ and $R^2$ independently of one another are $X-(OC_2H_4)_w-(OC_3He)_z$;

in which X is $C_{1-4}$ alkyl and preferably methyl;

w is a number from 12 to 120, preferably from 40 to 50;

z is a number from 1 to 10, preferably from 1 to 7; and a is a number from 4 to 9.

Because they are averages, w, z and a are not necessarily whole numbers for the polymer in bulk.

Mixtures of any of the above described materials may also be used.

When included, a composition of the invention will generally comprise from 0.05 to 5 wt %, preferably from 0.1 to 2 wt % of one or more SRPs (such as, for example, the copolyesters of general formula (III) as described above).

A composition of the invention may comprise one or more rheology modifiers. Examples of such materials include polymeric thickeners and/or structurants such as hydrophobically modified alkali swellable emulsion (HASE) copolymers. Exemplary HASE copolymers for use in the invention include linear or crosslinked copolymers that are prepared by the addition polymerization of a monomer mixture including at least one acidic vinyl monomer, such as (meth) acrylic acid (i.e. methacrylic acid and/or acrylic acid); and at least one associative monomer. The term "associative monomer" in the context of this invention denotes a monomer having an ethylenically unsaturated section (for addition polymerization with the other monomers in the mixture) and a hydrophobic section. A preferred type of associative monomer includes a polyoxyalkylene section between the ethylenically unsaturated section and the hydrophobic section. Preferred HASE copolymers for use in the invention include linear or crosslinked copolymers that are prepared by the addition polymerization of (meth)acrylic acid with (i) at least one associative monomer selected from linear or branched $C_8$-$C_{40}$ alkyl (preferably linear $C_{12}$-$C_{22}$ alkyl) polyethoxylated (meth)acrylates; and (ii) at least one further monomer selected from $C_1$-$C_4$ alkyl (meth) acrylates, polyacidic vinyl monomers (such as maleic acid, maleic anhydride and/or salts thereof) and mixtures thereof. The polyethoxylated portion of the associative monomer (i) generally comprises about 5 to about 100, preferably about 10 to about 80, and more preferably about 15 to about 60 oxyethylene repeating units. Mixtures of any of the above described materials may also be used. When included, a composition of the invention will preferably comprise from 0.1 to 5 wt % of one or more polymeric thickeners such as the HASE copolymers which are described above.

Compositions of the invention may also have their rheology modified by use of one or more external structurants which form a structuring network within the composition. Examples of such materials include hydrogenated castor oil, microfibrous cellulose and citrus pulp fibre. The presence of an external structurant may provide shear thinning rheology and may also enable materials such as encapsulates and visual cues to be suspended stably in the liquid.

Preferably, the composition of the invention may also be free from rheological modifiers and/or structurants. Typically, the composition may be free from polymeric thickeners and/or structurants, such as hydrophobically modified alkali swellable emulsion (HASE) copolymers. The HASE copolymers are described as above. Herein, 'free from' refers to a composition containing less than 0.1 wt % of the modifiers and/or structurants, preferably less than 0.01 wt %, more preferably 0 wt %.

A composition of the invention may comprise an effective amount of one or more enzyme selected from the group comprising, pectate lyase, protease, amylase, cellulase, lipase, mannanase and mixtures thereof. The enzymes are preferably present with corresponding enzyme stabilizers.

A composition of the invention may contain further optional ingredients to enhance performance and/or consumer acceptability. Examples of such ingredients include foam boosting agents, preservatives, polyelectrolytes, anti-shrinking agents, anti-wrinkle agents, anti-oxidants, sunscreens, anti-corrosion agents, drape imparting agents, anti-static agents, ironing aids, colorants, pearlisers and/or opacifiers, and shading dye. Each of these ingredients will be present in an amount effective to accomplish its purpose. Generally, these optional ingredients are included individually at an amount of up to 5 wt %.

A composition of the invention may be packaged as unit doses in polymeric film adapted to be insoluble until added to water. Herein, 'insoluble' should be understood to mean that the film has a solubility in water of up to 0.1 g/100 ml, preferably up to 0.01 g/100 ml, more preferably up to 0.001 g/100 ml, measured at 20° C. Alternatively, a composition of the invention may be supplied in a multidose pack. The multidose pack can be with a top or bottom closure. A dosing measure may be supplied with the multidose pack, either as a part of the cap or as an integrated system.

A composition of the invention can be used to remove soils from fabrics, especially particulate soils. A corresponding method involves diluting a dose of the composition of the invention to obtain a wash liquor and washing fabrics with the wash liquor so formed.

The removal of soils may suitably be carried out in a top-loading or front-loading automatic washing machine or can be carried out by hand.

In automatic washing machines, the dose of detergent composition is typically put into a dispenser and from there it is flushed into the machine by the water flowing into the machine, thereby forming the wash liquor. Dosages for a typical front-loading washing machine (using 10 to 15 litres of water to form the wash liquor) may range from about 10 g to about 100 g, preferably about 15 to 75 g. Dosages for a typical top-loading washing machine (using from 40 to 60 litres of water to form the wash liquor) may be higher, e.g. 100 g or more. Lower dosages of detergent (e.g. 50 g or less) may be used for hand washing methods (using about 1 to 10 litres of water to form the wash liquor). A subsequent aqueous rinse step and drying the laundry are preferred.

To effectively remove soils, the dose of the composition of the invention can be diluted in such a way that the wash liquor obtained comprises from 0.01 to 5 g/L of surfactants and 1 to 100 ppm amphoterically-modified oligopropyleneimine ethoxylates conforming to formula (I). Preferably, the wash liquor obtained comprises from 0.035 to 0.8 g/L of the non-soap anionic surfactant and 1 to 50 ppm said oligomer conforming to formula (I).

A composition of the invention may be prepared by adding the amphoterically-modified oligopropyleneimine ethoxylates conforming to formula (I) at a desired level to a surfactant aqueous solution. The mixture is stirred at ambience until homogeneous, i.e. without any visible lumps. If a rheological modifier is used, the modifier is preferably diluted with water first to obtain a solution. Preferably, such solution is at least partially neutralized prior to addition to the mix of oligopropyleneimine and surfactant. Such pre-neutralization may ease the manufacturing with respect to short batch cycle time and/or reduced mixing energy. Alternatively, the neutralization can happen after the addition of such solution to said mix. Then other optional ingredients are added with mixing until a liquid with homogeneity is obtained. The resultant liquid laundry composition is filled into the packaging of choice, such as a unitdose or a multidose pack.

The present invention may be illustrated by the following non-limiting examples.

EXAMPLES

Preparation of the Antiredeposition Agents of Amphoterically Modified Oligopropyleneimine Ethoxylates of (I) and the Comparative Antiredeposition Aments Synthesis of Bis-(3,3'-aminopropyl)amine (Dipropylenetriamine, DPTA): Acrylonitrile (7.8 kg, 0.15 kmol, 1.0 equiv.) was dropwise introduced to an excess of 1,3-diaminopropane (27.0 kg, 0.36 kmol, 2.5 equiv.) in a reaction vessel at 60° C. and kept under 65° C. After complete addition reaction, the reaction was stirred for 2 hours at 60° C. and then cooled to room temperature. The crude mixture was next analyzed via GC chromatography and was found to give a distribution of 45% (GC area-%) unreacted starting material, 47% (GC area-%) desired monocyanoethylated compound and 7% (GC area-%) dicyanoethylated compound (34.8 kg). Subsequently and without any further purification, the above-mentioned crude mixture was subjected to a hydrogenation in a fixed bed pressure reactor catalyzed by a [Co]-catalyst at 90° C. and 200 bar hydrogen pressure alongside with ammonia (28-45 equiv.). The crude oligoamine mixture was subjected to a fractional distillation under reduced pressure (140 to 20 mbar) and at elevated temperatures (120-220° C. column temperature) to give DPTA (134° C.; 20 mbar; purity >99%) as a colorless liquid. GC-Analysis (30 m RTX5 Amin column; injection temperature at 60° C. then heated with 10° C./min to 280° C.): $R_t$=11.39 min (DPTA) and $R_t$=17.25 min (TPTA). $^1$H-NMR (500 MHz, $CDCl_3$): δ=2.75 (m, 8H), 1.59 (m, 4H), 1.09 (bs, 5H) ppm. $^{13}$C-NMR (125 MHz, $CDCl_3$): δ=40.0, 39.9, 39.7, 37.6, 37.4, 37.3 ppm.

Synthesis of Bis-(3,3'-aminopropyl)-1,3-propylenediamine (Tripropylenetetramine, TPTA): Acrylonitrile (795 g, 15.0 mol, 2.05 equiv.) was dropwise introduced to 1,3-diaminopropane (542 g, 7.3 mol, 1.0 equiv.) in a reaction vessel at 13° C. within 4 hours and kept below 15° C. After complete addition reaction, the reaction was stirred for another 2 h at 15° C. and then warmed to room temperature. Subsequently and without any further purification, the above-mentioned crude mixture was subjected to a hydrogenation in a batch pressure reactor catalyzed by a Raney-Ni-catalyst (5 wt %) at 100° C. and 200 bar hydrogen pressure and stirred for 12 hours. After complete reaction, the reaction was quenched by purging the reaction vessel with nitrogen, the catalyst was removed by filtration and volatiles were removed under reduced pressure. The desired target compound was obtained after distillation under reduced pressure (3 mbar) and at elevated temperatures (170° C. column temperature) and gave TPTA (130° C.; 3 mbar; >99% purity) as a colorless liquid. GC-Analysis (30 m RTX5 Amin column; injection temperature at 60° C. then heated with 10° C./min to 280° C.): $R_t$=17.25 min (TPTA). $^1$H-NMR (500 MHz, MeOD): δ=4.6 (m, 6H), 2.7-2.6 (m, 12H), 1.7-1.6 (bs, 6H) ppm. $^{13}$C-NMR (125 MHz, MeOD): δ=49.1, 48.9, 48.8, 48.7, 48.5, 48.3, 40.6, 33.6, 30.1 ppm.

Synthesis of Tris-(3,3',3"-aminopropyl)-1,3-propylenediamine (Tetrapropylenepentamine, TPPA): Acrylonitrile (339 g, 6.4 mol, 2.0 equiv.) was dropwise introduced to a mixture of tripropylenetetramine (TPTA, 598 g, 3.2 mol, 1.0 equiv.) in THF (750 mL) in a reaction vessel at 50° C. After complete addition reaction, the reaction was stirred for another 2 hours at 50° C. and then cooled to room temperature. Subsequently and without any further purification, the above-mentioned crude mixture was subjected to a hydrogenation in a batch pressure reactor catalyzed by a Raney-Co-catalyst (5 wt %) in THF at 120° C. and 100 bar hydrogen pressure and stirred for 8 hours. After complete reaction, the reaction was quenched by purging the reaction vessel with nitrogen, the catalyst was removed by filtration and the solvent was removed under reduced pressure. The desired target compound was obtained next to pentapropylenehexamine (PPHA) after distillation under reduced pressure (2 mbar) and at elevated temperatures (270° C. column temperature) and gave TPPA (147° C.; 2 mbar; 93% purity) as a yellow oil. GC-Analysis (30 m RTX5 Amin column; injection temperature at 80° C. then heated with 15° C./min to 280° C.): $R_t$=20.23 min (TPPA).

Synthesis of oligomer 1 (P1) according to formula (I): 96.03 g dipropylene triamine (DPTA, 0.83 mol, 1 equiv.) and 10 g water are charged to a steel pressure reactor. The reactor is purged with nitrogen to remove air and a nitrogen pressure of 1 bar is set. The reactor is heated to 100° C. and 130 g of ethylene oxide (2.95 mol, 3.56 equiv.) are dosed into the reactor within seven hours. After that, the reaction mixture is kept at 100° C. for post reaction. Volatile compounds are removed under vacuum and 221.5 g of a clear and highly viscous product is removed from the reactor. 39.8 g of the previously obtained product are filled into a steel pressure reactor and 2.4 g of potassium hydroxide (50% aqueous solution) are added. Water is removed under reduced pressure. The reactor is purged with nitrogen to remove air and a nitrogen pressure of 1 bar is set. The reactor is heated to 120° C. and 548 g of ethylene oxide (12.4 mol, 99.7 equiv.) are added within six hours. Volatile compounds are removed under vacuum and 589 g of a brown solid were obtained. 200 g of the obtained ethoxylate (0.044 mol, 1 equiv.) are heated to 60° C. and filled into a glass reactor under nitrogen atmosphere. 16.2 g dimethyl sulfate (0.13 mol, 2.9 equiv.) are dosed into the reactor in such a manner that 1 ml of DMS is added per minute. Upon addition the temperature increases to 70° C. After completion of the addition, the mixture is allowed to post-react at 70° C. for two hours. 3.6 g of sulfuric acid (0.036 mol, 0.9 equiv.) are added to the reactor and the temperature is increased to 90° C. and the reactor is set under vacuum (15 mbar) for three hours. After completion of the reaction, 5.4 g of sodium hydroxide (50% aqueous solution) and 40 g of demineralized water are added, and the orange liquid product is removed from the reactor.

Synthesis of oligomer 2 (P2) according to formula (I): 297.9 g tripropylene tetraamine (TPTA, 1.58 mol, 1 equiv.) and 29.8 g water are charged to a steel pressure reactor. The reactor is purged with nitrogen to remove air and a nitrogen pressure of 2.5 bar is set. The reactor is heated to 100° C. and 335 g of ethylene oxide (7.61 mol, 4.81 equiv.) are dosed into the reactor within ten hours. After that, the reaction mixture is kept at 100° C. for six hours for post reaction. Volatile compounds are removed under vacuum and 626.4 g of a clear and highly viscous product is removed from the reactor. 100 g of the previously obtained product are filled into a steel pressure reactor and 5.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 1270 g of ethylene oxide (28.8 mol, 115.2 equiv.) are added within 16 hours. Volatile compounds are removed under vacuum and 1374.2 g of a brown solid were obtained. 705.1 g of the obtained ethoxylate (0.13 mol, 1 equiv.) are heated to 60° C. and filled into a glass reactor under nitrogen atmosphere. 62.1 g dimethyl sulfate (0.49 mol, 3.8 equiv.) are dosed into the reactor in such a manner that 1 ml of DMS is added per minute. Upon addition the temperature increases to 70° C. After completion of the addition, the mixture is allowed to post-react at 70° C. for two hours. 8.0 g of sulfuric acid (0.08 mol, 0.6 equiv.) are added to the reactor, the temperature is increased to 90° C. and the reactor is set under vacuum (15 mbar) for three hours. After completion of the reaction, 11.0 g of sodium hydroxide (50% aqueous solution) and 650 g of demineralized water are added. The liquid product is removed from the reactor.

Synthesis of oligomer 3 (P3) according to formula (I): 138.9 g tripropylene tetraamine (TPTA, 0.74 mol, 1 equiv.) and 13.9 g water are charged to a steel pressure reactor. The reactor is purged with nitrogen to remove air and a nitrogen pressure of 1 bar is set. The reactor is heated to 100° C. and 156 g of ethylene oxide (3.54 mol, 4.81 equiv.) are dosed into the reactor within ten hours. After that, the reaction mixture is kept at 100° C. for five hours for post reaction. Volatile compounds are removed under vacuum and 290 g of a clear and highly viscous product is removed from the reactor. 63 g of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 1 bar is set. The reactor is heated to 120° C. and 696 g of ethylene oxide (15.8 mol, 100.3 equiv.) are added within 10 hours. Volatile compounds are removed under vacuum and 754.8 g of a brown solid were obtained. 556 g of the obtained ethoxylate (0.12 mol, 1 eq.) are heated to 60° C. and filled into a glass reactor under nitrogen atmosphere. 57.4 g dimethyl sulfate (0.49 mol, 3.8 equiv.) are dosed into the reactor in such a manner that 1 ml of DMS is added per minute. Upon addition the temperature increases to 70° C. After completion of the addition, the mixture is allowed to post-react at 70° C. for two hours. 7.0 g of sulfuric acid (0.07 mol, 0.6 equiv.) are added to the reactor, the temperature is increased to 90° C. and the reactor is set under vacuum (15 mbar) for three hours. After completion of the reaction, 10.0 g of sodium hydroxide (50% aqueous solution) and 500 g of demineralized water are added, and the orange liquid product is removed from the reactor.

Synthesis of oligomer 4 (P4) according to formula (I): 173.8 g tripropylene tetraamine (TPTA, 0.92 mol, 1 equiv.) and 17.3 g water are charged to a steel pressure reactor. The reactor is purged with nitrogen to remove air and a nitrogen pressure of 2.5 bar is set. The reactor is heated to 100° C. and 195 g of ethylene oxide (4.43 mol, 4.81 equiv.) are dosed into the reactor within ten hours. After that, the reaction mixture is kept at 100° C. for six hours for post reaction. Volatile compounds are removed under vacuum and 366.8 g of a clear and highly viscous product is removed from the reactor. 60 g of the previously obtained product are filled into a steel pressure reactor and 4.9 g of potassium hydroxide (50% aqueous solution) are added. Water is removed under reduced pressure. The reactor is purged with nitrogen to remove air and a nitrogen pressure of 1 bar is set. The reactor is heated to 120° C. and 1159 g of ethylene oxide (26.2 mol, 174.6 equiv.) are added within 15 hours. Volatile compounds are removed under vacuum and 1233 g of a brown solid were obtained. 488.1 g of the obtained ethoxylate (0.06 mol, 1 equiv.) are heated to 60° C. and filled into a glass reactor under nitrogen atmosphere. 29.3 g dimethyl sulfate (0.23 mol, 3.87 equiv.) are dosed into the reactor in such a manner that 1 ml of DMS is added per minute. Upon addition the temperature increases to 70° C. After completion of the addition, the mixture is allowed to post-react at 70° C. for two hours. 6.7 g of sulfuric acid (0.07 mol, 0.6 equiv) are added to the reactor, the temperature is increased to 90° C. and the reactor is set under vacuum (15 mbar) for three hours. After completion of the reaction, 8.5 g of sodium hydroxide (50% aqueous solution) and 488.1 g of demineralized water are added, and the orange liquid product is removed from the reactor.

Synthesis of oligomer 5 (P5) according to formula (I): 83.3 g tripropylene tetraamine (TPTA, 0.44 mol, 1 equiv.) and 8.3 g water are charged to a steel pressure reactor. The reactor is purged with nitrogen to remove air and a nitrogen pressure of 2.5 bar is set. The reactor is heated to 120° C. and 93.5 g of ethylene oxide (2.12 mol, 4.83 equiv.) are dosed into the reactor in such a way that the internal pressure does not exceed 5.5 bar. After that, the reaction mixture is kept at 120° C. for six hours for post reaction. 9.1 g of potassium hydroxide (50% aqueous solution) are added and water is removed under reduced pressure. The reactor is purged with nitrogen to remove air and a nitrogen pressure of 2.5 bar is set. The reactor is heated to 140° C. and 844 g of ethylene oxide (19.2 mol, 43.6 equiv.) are added in such a way that the internal pressure does not exceed 5.5 bar. The mixture is allowed to post-react for 6 hours. Volatile compounds are removed under vacuum and 952.2 g of a brown viscous liquid were obtained. 494 g of the previously obtained alkoxylate is charges into a steel pressure reactor, inertized with nitrogen, heated to 140° C. A pre-pressure of nitrogen of 2.5 bar is set and 667.4 g ethylene oxide (15.15 mol, 34.4 equiv.) are added to the reactor in such a way that the internal pressure remained below 5.5 bar. The mixture is allowed to post-react for six hours. Volatile compounds are removed in vacuo and 1060.8 g of a brown solid was obtained as product 326.3 g of the obtained ethoxylate (0.06 mol, 1 equiv.) are heated to 60° C. and filled into a glass reactor under nitrogen atmosphere. 29.9 g dimethyl sulfate (0.24 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. 4.0 g of sulfuric acid (0.04 mol, 0.68 equiv) are added to the reactor, the temperature is increased to 90° C. and the reactor is set under vacuum (15 mbar) for three hours. After completion of the reaction, 9.14 g of triethanolamine and 143.1 g of demineralized water are added, and the orange liquid product is removed from the reactor.

Synthesis of oligomer 6 (P6) according to formula (I): 62.9 g tetrapropylene pentaamine (TPPA, 0.26 mol, 1 equiv.) and 6.3 g water are charged to a steel pressure reactor. The reactor is purged with nitrogen to remove air and a nitrogen pressure of 3.5 bar is set. The reactor is heated to 100° C. and 60 g of ethylene oxide (1.36 mol, 5.2 equiv.) are dosed into the reactor within seven hours. After that, the reaction mixture is kept at 100° C. for post reaction. Volatile compounds are removed under vacuum and 6.2 g of potassium hydroxide (50% aqueous solution) are added. Water is removed under reduced pressure. The reactor is purged with nitrogen to remove air and a nitrogen pressure of 1.5 bar is set. The reactor is heated to 120° C. and 1435 g of ethylene oxide (32.575 mol, 125 equiv.) are added within 12 hours. Volatile compounds are removed under vacuum and 1589.2 g of a brown solid were obtained. 314.2 g of the obtained ethoxylate (0.05 mol, 1 equiv.) are heated to 60° C. and filled into a glass reactor under nitrogen atmosphere. 31.4 g dimethyl sulfate (0.25 mol, 4.9 equiv.) are dosed into the reactor in such a manner that 1 ml of DMS is added per minute. Upon addition the temperature increases to 70° C. After completion of the addition, the mixture is allowed to post-react at 70° C. for two hours. 3.5 g of sulfuric acid (0.036 mol, 0.7 eq) are added to the reactor, the temperature is increased to 90° C. and the reactor is set under vacuum (15 mbar) for three hours. After completion of the reaction, 5.0 g of sodium hydroxide (50% aqueous solution) and 300 g of demineralized water are added, and the orange liquid product is removed from the reactor.

Synthesis of comparative example (CP1): 297.9 g tripropylene tetraamine (TPTA, 1.58 mol, 1 equiv.) and 29.8 g water are charged to a steel pressure reactor. The reactor is purged with nitrogen to remove air and a nitrogen pressure of 2.5 bar is set. The reactor is heated to 100° C. and 335 g of ethylene oxide (7.61 mol, 4.81 equiv.) are dosed into the reactor within ten hours. After that, the reaction mixture is kept at 100° C. for six hours for post reaction. Volatile compounds are removed under vacuum and 626.4 g of a clear and highly viscous product is removed from the reactor. 100 g of the previously obtained product are filled into a steel pressure reactor and 5.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 1270 g of ethylene oxide (28.8 mol, 115.2 equiv.) are added within 16 hours. Volatile compounds are removed under vacuum and 1374.2 g of a brown solid were obtained.

Synthesis of comparative example 2 (CP2): 99.1 g tripropylene tetraamine (TPTA, 0.53 mol, 1 equiv.) and 9.9 g water are charged to a steel pressure reactor. The reactor is purged with nitrogen to remove air and a nitrogen pressure of 1.0 bar is set. The reactor is heated to 100° C. and 112 g of ethylene oxide (2.54 mol, 4.83 equiv.) are dosed into the reactor within six hours. After that, the reaction mixture is kept at 100° C. for six hours for post reaction. Volatile compounds are removed under vacuum and 210 g of a clear and highly viscous product is removed from the reactor. 39.2 g of the previously obtained product are filled into a steel pressure reactor and 1.1 g of potassium hydroxide (50% aqueous solution) are added. Water is removed under reduced pressure. The reactor is purged with nitrogen to remove air and a nitrogen pressure of 1 bar is set. The reactor is heated to 120° C. and 498 g of ethylene oxide (11.3 mol, 115.2 equiv.) are added within 10 hours. Volatile compounds are removed under vacuum and 536 g of a brown solid were obtained. 115 g of the obtained ethoxylate (0.02 mol, 1 equiv.) are heated to 60° C. and filled into a glass reactor under nitrogen atmosphere. 10.3 g dimethyl sulfate (0.08 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. Sodium hydroxide (50% aqueous solution) is added to set the pH to 8.2 The product is obtained as light brown solid.

Synthesis of comparative example 3 (CP3): 500 g polypropyleneimine and 17 g water are charged to a steel pressure reactor. The reactor is purged with nitrogen to remove air and a nitrogen pressure of 2.5 bar is set. The reactor is heated to 120° C. and 348 g of ethylene oxide are dosed into the reactor within six hours. After that, the reaction mixture is kept at 120° C. for six hours for post reaction. Volatile compounds are removed under vacuum and 825 g of a yellow and highly viscous product is removed from the reactor. 90 g of the previously obtained product are filled into a steel pressure reactor and 3.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 783 g of ethylene oxide (17.8 mol) are added within 16 hours. Volatile compounds are removed under vacuum and 875 g of a brown solid were obtained.

Synthesis of comparative example 4 (CP4): 500 g polypropyleneimine and 17 g water are charged to a steel pressure reactor. The reactor is purged with nitrogen to remove air and a nitrogen pressure of 2.5 bar is set. The reactor is heated to 120° C. and 348 g of ethylene oxide are dosed into the reactor within six hours. After that, the reaction mixture is kept at 120° C. for six hours for post reaction. Volatile compounds are removed under vacuum and 825 g of a yellow and highly viscous product is removed from the reactor. 90 g of the previously obtained product are filled into a steel pressure reactor and 3.5 g of potassium hydroxide (50% aqueous solution) are added. Water is removed under reduced pressure. The reactor is purged with nitrogen to remove air and a nitrogen pressure of 2 bar is set. The reactor is heated to 120° C. and 783 g of ethylene oxide (17.8 mol) are added within 16 hours. Volatile compounds are removed under vacuum and 875 g of a brown solid were obtained. 78.1 g of the obtained ethoxylate are heated to 60° C. and filled into a glass reactor under nitrogen atmosphere. 6.6 g dimethyl sulfate (0.05 mol) are dosed into the reactor in such a manner that 1 ml of DMS is added per minute. Upon addition the temperature increases to 70° C. After completion of the addition, the mixture is allowed to post-react at 70° C. for two hours and neutralized with 5.4 g sodium hydroxide (50% aqueous solution) and 82.2 g of a brown solid was obtained. 33.0 g of the brown solid was heated to 60° C. and 1.2 g of sulfuric acid are added to the reactor, the temperature is increased to 90° C. and the reactor is set under vacuum (15 mbar) for three hours. After completion of the reaction, 2.7 g of sodium hydroxide (50% aqueous solution) is added. The product is obtained as brown solid.

Synthesis of comparative example 5 (CP5): 98.9 g 1,3-propylendiamine (1,3-PDA, 1.33 mol, 1 equiv.) and 9.9 g water are charged to a steel pressure reactor. The reactor is purged with nitrogen to remove air and a nitrogen pressure of 1.0 bar is set. The reactor is heated to 100° C. and 189 g of ethylene oxide (4.29 mol, 3.23 equiv.) are dosed into the reactor within six hours. After that, the reaction mixture is kept at 100° C. for six hours for post reaction. Volatile compounds are removed under vacuum and 210 g of a clear and highly viscous product is removed from the reactor. 50.05 g of the previously obtained product are filled into a steel pressure reactor and 3.3 g of potassium hydroxide (50% aqueous solution) are added. Water is removed under reduced pressure. The reactor is purged with nitrogen to remove air and a nitrogen pressure of 1 bar is set. The reactor is heated to 120° C. and 788 g of ethylene oxide (17.9 mol, 76.9 equiv.) are added within 10 hours. Volatile compounds are removed under vacuum and 838.1 g of a brown solid were obtained. 200 g of the obtained ethoxylate (0.06 mol, 1 eq.) are heated to 60° C. and filled into a glass reactor under nitrogen atmosphere. 13.8 g dimethyl sulfate (0.11 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 3.6 g of sulfuric acid (0.04 mol, 0.6 equiv.) are added to the reactor and the temperature is increased to 90° C. and the reactor is set under vacuum (15 mbar) for three hours. After completion of the reaction, 5.0 g of sodium hydroxide (50% aqueous solution) and 40 g of demineralized water are added, and the orange liquid product is removed from the reactor.

Synthesis of comparative example 6 (CP6): 364 g hexamethylenediamine (HMDA, 3.13 mol, 1 equiv.) and 36.4 g water are charged to a steel pressure reactor. The reactor is purged with nitrogen to remove air and a nitrogen pressure of 2.0 bar is set. The reactor is heated to 100° C. and 442 g of ethylene oxide (10.0 mol, 3.19 equiv.) are dosed into the reactor within six hours. After that, the reaction mixture is kept at 100° C. for six hours for post reaction. Volatile compounds are removed under vacuum and 795.2 g of a clear and highly viscous product is removed from the reactor. 80 g (0.43 mol, 1.0 equiv.) of the previously obtained product are filled into a steel pressure reactor and 3.3 g of potassium hydroxide (50% aqueous solution) are added. Water is removed under reduced pressure. The reactor is purged with nitrogen to remove air and a nitrogen pressure of 1 bar is set. The reactor is heated to 130° C. and 1053 g of ethylene oxide (23.9 mol, 55.7 equiv.) are added within 15 hours. Volatile compounds are removed under vacuum and 1149.4 g of a brown solid were obtained. 364 g of the obtained ethoxylate (0.1 mol, 1 equiv.) are heated to 60° C. and filled into a glass reactor under nitrogen atmosphere. 24.8 g dimethyl sulfate (0.20 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 3.4 g of sulfuric acid (0.03 mol, 0.3 equiv.) are added to the reactor and the temperature is increased to 90° C. and the reactor is set under vacuum (15 mbar) for three hours. After completion of the reaction, 3.27 g of sodium hydroxide (50% aqueous solution) and 384 g of demineralized water are added, and the liquid product is removed from the reactor.

Synthesis of comparative example 7 (CP7): 97.9 g ethylenediamine (EDA, 1.63 mol, 1 equiv.) and 9.7 g water are charged to a steel pressure reactor. The reactor is purged with nitrogen to remove air and a nitrogen pressure of 1.0 bar is set. The reactor is heated to 100° C. and 230 g of ethylene oxide (5.22 mol, 3.2 equiv.) are dosed into the reactor within six hours. After that, the reaction mixture is kept at 100° C. for six hours for post reaction. Volatile compounds are removed under vacuum and 327 g of a clear and highly viscous product is removed from the reactor. 42.6 g (0.21 mol, 1.0 equiv.) of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 1 bar is set. The reactor is heated to 130° C. and 717 g of ethylene oxide (16.3 mol, 77.5 equiv.) are added within 15 hours. Volatile compounds are removed under vacuum and 752.8 g of a brown solid were obtained. 200 g of the obtained ethoxylate (0.06 mol, 1 equiv.) are heated to 60° C. and filled into a glass reactor under nitrogen atmosphere. 13.9 g dimethyl sulfate (0.11 mol, 1.9 equiv.) are dosed into the reactor in such a manner that 1 ml of DMS is added per minute. Upon addition the temperature increases to 70° C. After completion of the addition, the mixture is allowed to post-react at 70° C. for two hours. 4.2 g of sulfuric acid (0.04 mol, 0.6 equiv.) are added to the reactor and the temperature is increased to 90° C. and the reactor is set under vacuum (15 mbar) for three hours. After completion of the reaction, 7.8 g of sodium hydroxide (50% aqueous solution) and 40 g of demineralized water are added, and the orange liquid product is removed from the reactor.

Synthesis of comparative example 8 (CP8): 96.7 g diethylenediamine (DETA, 0.94 mol, 1 equiv.) and 9.7 g water are charged to a steel pressure reactor. The reactor is purged with nitrogen to remove air and a nitrogen pressure of 1.0 bar is set. The reactor is heated to 100° C. and 136 g of ethylene oxide (3.08 mol, 3.3 equiv.) are dosed into the reactor within six hours. After that, the reaction mixture is kept at 100° C. for six hours for post reaction. Volatile compounds are removed under vacuum and 231 g of a clear and highly viscous product is removed from the reactor. 45.9 g (0.16 mol, 1.0 equiv.) of the previously obtained product are filled into a steel pressure reactor and 2.9 g of potassium hydroxide (50% aqueous solution) are added. Water is removed under reduced pressure. The reactor is purged with nitrogen to remove air and a nitrogen pressure of 1 bar is set. The reactor is heated to 130° C. and 696 g of ethylene oxide (15.8 mol, 98.8 equiv.) are added within 15 hours. Volatile compounds are removed under vacuum and 732.7 g of a brown solid were obtained. 200 g of the obtained ethoxylate (0.04 mol, 1 equiv.) are heated to 60° C. and filled into a glass reactor under nitrogen atmosphere. 16.5 g dimethyl sulfate (0.13 mol, 2.9 equiv.) are dosed into the reactor in such a manner that 1 ml of DMS is added per minute. Upon addition the temperature increases to 70° C. After completion of the addition, the mixture is allowed to post-react at 70° C. for two hours. 3.9 g of sulfuric acid (0.04 mol, 0.8 eq) are added to the reactor and the temperature is increased to 90° C. and the reactor is set under vacuum (15 mbar) for three hours. After completion of the reaction, 6.8 g of sodium hydroxide (50% aqueous solution) and 40 g of demineralized water are added, and the orange liquid product is removed from the reactor.

Synthesis of comparative example 9 (CP9): 233.6 g triethylenetetraamine (TETA, 1.60 mol, 1 equiv.) and 23.3 g water are charged to a steel pressure reactor. The reactor is purged with nitrogen to remove air and a nitrogen pressure of 1.0 bar is set. The reactor is heated to 100° C. and 338 g of ethylene oxide (7.67 mol, 4.8 equiv.) are dosed into the reactor within six hours. After that, the reaction mixture is kept at 100° C. for six hours for post reaction. Volatile compounds are removed under vacuum and 571 g of a clear and highly viscous product is removed from the reactor. 46.3 g (0.13 mol, 1.0 equiv.) of the previously obtained product are filled into a steel pressure reactor and 2.8 g of potassium hydroxide (50% aqueous solution) are added. Water is removed under reduced pressure. The reactor is purged with nitrogen to remove air and a nitrogen pressure of 1 bar is set. The reactor is heated to 130° C. and 658 g of ethylene oxide (14.9 mol, 114.9 equiv.) are added within 15 hours. Volatile compounds are removed under vacuum and 694 g of a brown solid were obtained. 200 g of the obtained ethoxylate (0.04 mol, 1 equiv.) are heated to 60° C. and filled into a glass reactor under nitrogen atmosphere. 17.4 g dimethyl sulfate (0.14 mol, 3.75 equiv.) are dosed into the reactor in such a manner that 1 ml of DMS is added per minute. Upon addition the temperature increases to 70° C. After completion of the addition, the mixture is allowed to post-react at 70° C. for two hours. 3.0 g of sulfuric acid (0.03 mol, 0.8 equiv.) are added to the reactor and the temperature is increased to 90° C. and the reactor is set under vacuum (15 mbar) for three hours. After completion of the reaction, 7.6 g of sodium hydroxide (50% aqueous solution) and 40 g of demineralized water are added, and the viscous liquid product is removed from the reactor.

Synthesis of comparative example 10 (CP10): synthesized as described in WO9532272 or U.S. Pat. No. 9,738,754 (PE1600+20 EO/NH).

Synthesis of comparative example 11 (CP11): 400 g tripropylenetetraamine (TPTA, 2.12 mol, 1 equiv.) and 40 g water are charged to a steel pressure reactor. The reactor is purged with nitrogen to remove air and a nitrogen pressure of 2.5 bar is set. The reactor is heated to 100° C. and 450 g of ethylene oxide (10.22 mol, 4.8 equiv.) are dosed into the reactor within ten hours. After that, the reaction mixture is kept at 100° C. for six hours for post reaction. Volatile compounds are removed under vacuum and 945 g of a clear and highly viscous product is removed from the reactor. 50.0 g (0.13 mol, 1.0 equiv.) of the previously obtained product are filled into a steel pressure reactor and 3.0 g of potassium hydroxide (50% aqueous solution) are added. Water is removed under reduced pressure. The reactor is purged with nitrogen to remove air and a nitrogen pressure of 2 bar is set. The reactor is heated to 130° C. and 337 g of ethylene oxide (7.65 mol, 61.1 equiv.) are added within six hours. The mixture is allowed to post-react for six hours. After that, 87 g of propylene oxide (1.50 mol, 12.0 equiv.) are dosed into the reactor within two hours. The mixture is allowed to post-react for six hours at 130° C. Subsequently, 264 g ethylene oxide (5.99 mol, 48.0 equiv.) are dosed into the reactor at 130° C. and the mixture is allowed to post-react for six hours. Volatile compounds are removed under vacuum and 755 g of a yellow viscous liquid were obtained. 451.6 g of the obtained ethoxylate (0.08 mol, 1 equiv.) are heated to 60° C. and filled into a glass reactor under nitrogen atmosphere. 39.1 g dimethyl sulfate (0.31 mol, 3.9 equiv.) are dosed into the reactor in such a manner that 1 ml of DMS is added per minute. Upon addition the temperature increases to 70° C. After completion of the addition, the mixture is allowed to post-react at 70° C. for two hours. 5.80 g of sulfuric acid (0.06 mol, 0.7 equiv.) are added to the reactor and the temperature is increased to 90° C. and the reactor is set under vacuum (15 mbar) for three hours. After completion of the reaction, 7.9 g of sodium hydroxide (50% aqueous solution) and 440 g of demineralized water are added, and the orange liquid product is removed from the reactor.

Synthesis of comparative example 12 (CP12): synthesized as described in WO02020/030469 (PEI2000+32.5 EO/NH, Polymer P.2).

Characterization of inventive and comparative structures: Molecular weights of the examples were determined by gel permeation chromatography (GPC). The conditions applied were hexafluoroisopropanol and 0.05% trifluoroacetic acid potassium salt were used as solvent. The column oven temperature was set to 35° C. and the flow rate was 1 mL/min. 50 μL of the sample was injected and the concentration of the samples was set to 1.5 mg/mL. The samples were filtered after dissolution of the polymer using a Millipore Millflex FG (0.2 μm) filter to avoid blocking of the column. The following columns were used: a HFIP Guard column (diameter: 8 mm, length 5 cm), a PL HFIP Gel column (separation material styrene-divinylbenzene, diameter 7.5 mm, length: 30 cm) and a PL HFIPGel column (separation material styrene-divinylbenzene, diameter 7.5 mm, length: 30 cm, exclusion size: 100-100000 g/mol). The GPC system was calibrated using PMMA standards in the molecular weight range between 800 and 2200000 g/mol. The eluate was detected using a refractive index (RI) detector (DRI Agilent 1000)

TABLE 1

Chemical characteristics of the examples

| Example | Amine starting material (backbone) | Alkoxylation (side chain) | Modification | Molecular weight [g/mol] |
|---|---|---|---|---|
| P1 | DPTA | 20 EO/NH | amphoteric | 2930 |
| P2 | TPTA | 20 EO/NH | amphoteric | 4400 |
| P3 | TPTA | 17.5 EO/NH | amphoteric | 3730 |
| P4 | TPTA | 30 EO/NH | amphoteric | 7030 |
| P5 | TPTA | 20 EO/NH | amphoteric | 4010 |
| P6 | TPPA | 20 EO/NH | amphoteric | 4450 |
| CP1 | TPTA | 20 EO/NH | No | 5110 |
| CP2 | TPTA | 20 EO/NH | cationic | 4510 |
| CP3 | Polypropyleneimine based on 1,3-PDA)$ | 20 EO/NH | no modification | 5390 |
| CP4 | Same as CP3$ | 20 EO/NH | amphoteric | 2860 |
| CP5 | 1,3-Propylenediamine ("Monomer") | 20 EO/NH | amphoteric | 3360 |
| CP6 | 1,6-Diaminohexane (HMDA) | 20 EO/NH | amphoteric | 3950 |
| CP7 | Ethylenediamine (EDA) | 20 EO/NH | amphoteric | 3110 |
| CP8 | Diethylenetriamine (DETA) | 20 EO/NH | amphoteric | 3380 |
| CP9 | Triethylenetetramine (TETA) | 20 EO/NH | amphoteric | 4080 |
| CP10 | Polyethyleneimine¬ | 20 EO/NH | no modification | 8820 |
| CP11 | TPTA | 11 EO/NH + 2 PO/NH + 8 EO/NH | amphoteric | 3580 |
| CP12 | Polyethyleneimine* | 32.5 EO/NH | no modification | 42000 |

$Mw = 523 g/mol, Mn = 349 g/mol, PDI 1.5. The Mw of backbone is as described in EP2961821, higher than that of the backbone of oligomer conforming to formula(I)

¬Backbone is polyethyleneimine based on Aziridine, Mw 600 g/mol, as described in WO9532272 or U.S. Pat. No. 9,738,754.

*Backbone is polyethyleneimine based on Aziridine Mw 2000 g/mol, as described in WO2020/030469. Mw was determined by MALLS detector.

Measurements for Cleaning Performance and Viscosity

TABLE 2

| Liquid laundry compositions (used for cleaning performance) | |
|---|---|
| Ingredients | wt % |
| Linear $C_{12-14}$ alkylbenzenesulfonic acid | 8.00 |
| $C_{12}$ fatty alcohol × 3 EO sulfate | 6.00 |
| $C_{12-15}$ fatty alcohol × 7 EO | 6.00 |
| Mono propylene glycol (MPG) | 6.00 |
| Triethanolamine | 2.50 |
| Sodium hydroxide | 0.40 |
| Example of antiredeposition agent | 0.83 or 2.50 |
| Demin. water | add 100 |
| pH value | 7.4 |

TABLE 3

| Liquid laundry compositions (used for viscosity) | |
|---|---|
| Ingredients | wt % |
| Linear $C_{12-14}$ alkylbenzenesulfonic acid | 2.72 |
| $C_{12}$ fatty alcohol × 3 EO sulfate | 2.04 |
| $C_{12-15}$ fatty alcohol × 7 EO | 2.04 |
| $C_{12-18}$ fatty acid | 0.40 |
| HASE thickening polymer | 0.85 |
| 1-Hydroxyethane-1,1-diphosphonic acid (HEDP) | 0.70 |
| Triethanolamine | 3.52 |
| Fragrance | 0.65 |
| Preservative | 0.03 |
| Example of antiredeposition agent | 0.50 or 1.45 |
| Demin. water | ad 100 |
| pH value | 7.5 |

The cleaning performance on circular red pottery and yellow pottery stains on a polyester fabric (polyester and cotton ballast to yield a 1:1 ratio of polyester/cotton fabric per experiment, Warwick Equest, Consett, UK) was measured by determining the color difference (delta E) between the stains after wash and the unsoiled white fabric using a reflectometer (Datacolor SF600 plus). 4 circular red pottery and 4 yellow pottery stains were used in 1 experiment (i.e. 2 pieces of a polyester test fabric containing 2 circular red pottery and 2 yellow pottery stains), each experiment was repeated 3 times, thus a total of 12 washed stains for both red pottery clay and yellow pottery clay per test condition were obtained to calculate the average delta E value. By using these delta E values, the so-called "standardized cleaning performance" (delta delta E) has been calculated. The "standardized cleaning performance" (delta delta E) is the difference of the performance of detergents containing inventive and comparative antiredeposition agents, respectively, vs. the detergent without any antiredeposition agents, respectively.

The bigger the sum of the delta delta E value, the bigger the positive contribution of the respective antiredeposition agent on the cleaning performance. During each wash, 200 mL washing liquor was used in Linitest+ washing device (SDL Atlas Rock Hill, USA) with a fabric to liquor ratio of 1:10. The liquid detergent concentration was 3.0 g/L. The washing time was 30 minutes, at 40° C. with water hardness of 12° fH. After washing, the fabrics were rinsed twice, followed by drying at ambience overnight prior to the measurement with the reflectometer.

The viscosities of the compositions were measured using a rotational rheometer Rheolab QC (Anton Paar, Ostfildern, Germany), with spindle CC27, at room temperature (23° C.). The measurement was conducted from 0 to 1200 1/s shear rate.

TABLE 4

| Results for cleaning performance | | |
|---|---|---|
| Examples of antiredeposition agents comprised in the laundry liquid compositions | wt % of the examples in the laundry liquid compositions | Standardized cleaning performance of the laundry liquid compositions (sum delta delta E) ** |
| P1 | 0.83 | 17.8 |
| P2 | 0.83 | 23.3 |
| P3 | 0.83 | 20.4 |
| P4 | 0.83 | 21.1 |
| P5 | 0.83 | 24.0 |
| P6 | 0.83 | 22.9 |
| CP1 | 0.83 | 7.4 |
| CP2 | 0.83 | 16.3 |
| CP3 | 0.83 | 13.6 |
| CP4 | 0.83 | 2.8 |
| CP5 | 0.83 | 11.4 |
| CP6 | 0.83 | 8.5 |
| CP7 | 0.83 | 11.1 |
| CP8 | 0.83 | 14.7 |
| CP9 | 0.83 | 9.8 |
| CP10 | 0.83/2.50 | 6.5/9.1 |
| CP11 | 0.83 | 22.5 |
| CP12 | 2.50 | 6.9 |

** A 95% confidence interval of the applied method for the sum of delta delta E is +/−1.5.

It can be seen that when the oligomers are not amphoterically modified, the cleaning performance of the corresponding compositions is either significantly worse (CP1) or directionally worse (CP2) than those comprising the amphoterically modified oligomers according to formula (I). It can also be seen that when the backbone propyleneimine has a higher (CP3 and CP4) or lower (CP5) molecular weight than that corresponding to formula (I), the cleaning performance is also affected adversely, even independent of the type of modification (non-ionic polymer CP3; amphoterically-modified polymers: CP4 and CP5). It can further be seen that if the backbone structure is different from the required propyleneimine (CP6-9), the cleaning performance shows significant deterioration. Finally, when the antiredeposition agents are based on known polyethyleneimine (PEI) from prior art (CP10 and CP12), the corresponding compositions still exhibit significantly worse performance, even at higher concentration.

TABLE 5

| Results for viscosity | | |
|---|---|---|
| Examples of antiredeposition agents comprised in the laundry liquid compositions | wt % of the examples in the laundry liquid compositions | Viscosity of the laundry compositions [mPa s] |
| P1 | 0.50 | 1100 +/− 10 |
| P2 | 0.50 | 1040 +/− 10 |
| P3 | 0.50 | 1060 +/− 10 |
| P4 | 0.50 | 1110 +/− 10 |
| P5 | 0.50 | 1010 +/− 10 |
| P6 | 0.50 | 1190 +/− 10 |
| CP1 | 0.50 | 885 +/− 10 |
| CP2 | 0.50 | 750 +/− 10 |
| CP3 | 0.50 | 550 +/− 10 |

TABLE 5-continued

| Results for viscosity | | |
|---|---|---|
| Examples of antiredeposition agents comprised in the laundry liquid compositions | wt % of the examples in the laundry liquid compositions | Viscosity of the laundry compositions [mPa s] |
| CP10 | 1.45 | 580 +/- 10 |
| CP11 | 0.50 | 645 +/- 10 |
| CP12 | 1.45 | 1470 +/- 10 |

The results from the viscosity measurements clearly confirm the superiority of the oligomers according to formula (I). All compositions comprising said oligomers exhibit significantly higher viscosity than the compositions comprising comparative examples except CP12. However, CP12 needs to be included at a much higher level and even then, its cleaning performance is worse than inventive oligomers (cf. Table 4). The composition comprising CP11 (with side chains of mixed EO/PO other than EO) demonstrates a comparable cleaning performance (cf. Table 4) but a significantly worse viscosity.

The combination of results from Table 4 and Table 5 clearly demonstrates that only oligomers conforming to formula (I) can lead to the improved soil removal as well as maintaining the viscosity profile of the composition.

The invention claimed is:

1. A liquid laundry composition comprising:

(i) from 1 to 60 wt % of one or more surfactants selected from non-soap anionic surfactants, nonionic surfactants, and mixtures thereof; and (ii) from 0.05 to 10 wt % of an amphoterically-modified oligopropyleneimine ethoxylate having a following formula (I)

(I)

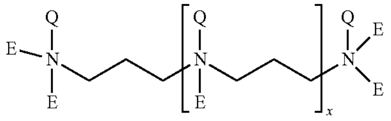

wherein E is an ethoxy side chain corresponding to a formula —$(RO)_n$—R' (I) in which R units are ethylene; n has an average value from 5 to 50; R' units are each independently selected from hydrogen and $SO_3^-$, wherein at least 30% of R' units are $SO_3^-$; Q units are each independently selected from $C_1$-$C_4$ alkyl, H and a free electron pair, wherein at least 50% of Q units are $C_1$-$C_4$ alkyl; and x ranges from 1 to 3.

2. A composition according to claim 1, wherein x is 1, 2 or 3; at least 80% of Q units are $C_1$-$C_4$ alkyl; and the ratio of Q=$C_1$-$C_4$ alkyl to R'=$SO_3^-$ ranges from 1:1 to 1:0.8.

3. A composition according to claim 1, wherein x is 2 or 3, and at least 90% of all Q units are methyl.

4. A composition according to claim 3, wherein x is 2 and n has an average value from 15 to 30.

5. A composition according to claim 1, wherein x is 2 and the composition further comprises one or more isomeric compounds of the following formula (II)

(II)

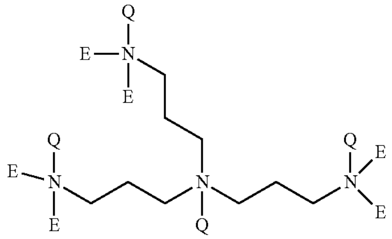

wherein E is an ethoxy side chain corresponding to a formula —$(RO)_n$—R' (I) in which R units are ethylene; n has an average value from 5 to 50; R' units are each independently selected from hydrogen and $SO_3^-$, wherein at least 30% of R' units are $SO_3^-$,and Q units are each independently selected from $C_1$-$C_4$ alkyl, H and a free electron pair, wherein at least 50% of Q units are $C_1$-$C_4$ alkyl.

6. A composition according to claim 5, wherein the molar ratio of amphoterica y-modified oligopropyleneimine ethoxylate of formula (I) to isomeric compound of formula (II) is at least 10:1.

7. A composition according to claim 1, further comprising a sulphate of an alkali metal andior an amine.

8. A composition according to claim 1, comprising from 0.10 to 5wt % of an amphoterically-modified oligopropyleneimine ethoxyiate.

9. A composition according to claim 1, comprising from 5 to 30 wt % of one or more non-soap anionic surfactants.

10. A composition according to claim 1, comprising from 0.05 to 5 wt% of one or more soil release polymers (SRPs) selected from copolyesters of dicarboxylic acids, diols and polydiols.

11. A composition according to claim 1, comprising:

(i) from 2 to 25 wt % of one or more linear alkylbenzene sulfonates (LAS);

(ii) from 2 to 20 wt % of one or more alkyl ether sulphate (RES) and/or from 2 to 25 wt % of one or more nonionic surfactants which are aliphatic alcohol ethoxylates;

(iii) from 0.10 to 5 wt % of an amphoterically-modified oligopropyleneimine ethoxylate; and (iv) from 0.1 to 2 wt % of one or more soil release polymers (SRPs) selected from copolyesters of dicarboxylic acids, diols and polydiols.

12. A composition according to claim 1, further comprising from 0.25 to 15 wt % of one or more fatty acids which are aliphatic carboxylic acids of a linear or branched alkyl or alkenyl chain containing from 6 to 24 carbon atoms.

13. A method of removing soils from fabrics, comprising steps in sequence of: (a) diluting a dose of a composition according to claim 1 to obtain a wash liquor, wherein the dose is from 10 to 100 g; and (b) washing fabrics with the wash liquor so formed.

14. A laundry product comprising a laundry composition according to claim 1, wherein the composition is contained within a multidose pack.

* * * * *